(12) United States Patent
Jordan et al.

(10) Patent No.: US 12,404,482 B2
(45) Date of Patent: *Sep. 2, 2025

(54) PROCESS FOR SEPARATING A FERMENTED MALT BEVERAGE

(71) Applicant: ABV Technology, Inc., Saint Paul, MN (US)

(72) Inventors: Benjamin M. Jordan, Minneapolis, MN (US); Chris Huelsnitz, St. Paul, MN (US); Kyle Sogard, Minneapolis, MN (US); Grant A. Williamson, Minneapolis, MN (US)

(73) Assignee: ABV Technology, Inc., Saint Paul, MN (US)

( * ) Notice: Subject to any disclaimer, the term of this patent is extended or adjusted under 35 U.S.C. 154(b) by 946 days.

This patent is subject to a terminal disclaimer.

(21) Appl. No.: 17/125,290

(22) Filed: Dec. 17, 2020

(65) Prior Publication Data

US 2021/0189308 A1 Jun. 24, 2021

Related U.S. Application Data

(60) Provisional application No. 62/950,602, filed on Dec. 19, 2019.

(51) Int. Cl.
| | |
|---|---|
| *C12H 3/02* | (2019.01) |
| *A23L 2/38* | (2021.01) |
| *A23L 7/25* | (2016.01) |
| *B01D 1/00* | (2006.01) |
| *B01D 1/28* | (2006.01) |
| *B01D 3/00* | (2006.01) |
| *B01D 5/00* | (2006.01) |
| *B01D 35/18* | (2006.01) |

(52) U.S. Cl.
CPC ............... *C12H 3/02* (2019.02); *A23L 2/382* (2013.01); *A23L 7/25* (2016.08); *B01D 1/0082* (2013.01); *B01D 1/0088* (2013.01); *B01D 1/28* (2013.01); *B01D 3/001* (2013.01); *B01D 5/006* (2013.01); *B01D 5/009* (2013.01); *B01D 35/18* (2013.01); *A23V 2002/00* (2013.01)

(58) Field of Classification Search
CPC ........ B01D 5/006; B01D 35/18; B01D 5/009; B01D 1/28; B01D 1/0082; B01D 3/143; B01D 1/0088; B01D 3/001; B01D 3/002; B01D 3/42; A23L 7/25; A23L 2/382; C12C 11/11; A23V 2002/00
USPC ........................................................ 99/277
See application file for complete search history.

(56) References Cited

U.S. PATENT DOCUMENTS

| | | | | |
|---|---|---|---|---|
| 4,405,652 A | * | 9/1983 | Boucher | .................. C12H 6/02 426/15 |
| 4,570,534 A | * | 2/1986 | Boucher | ................ B01D 1/222 426/494 |
| 4,978,518 A | * | 12/1990 | Lesher | .................. B01D 3/143 423/504 |

(Continued)

*Primary Examiner* — Eric S Stapleton
(74) *Attorney, Agent, or Firm* — Schwegman Lundberg & Woessner, P.A.

(57) ABSTRACT

A process that produces a non-alcohol cereal beverage (NACB) includes separating an input fermented malt beverage (FMB) into an output FMB and the NACB, wherein the separating includes multiple stages; and adding water during the separating so that the output FMB has the same alcohol by volume (ABV) as the input FMB during each stage of the separating.

7 Claims, 24 Drawing Sheets

(56) References Cited

U.S. PATENT DOCUMENTS

| | | | | |
|---|---|---|---|---|
| 5,176,002 | A * | 1/1993 | O'Brien | B01D 5/0039 |
| | | | | 62/48.2 |
| 5,520,723 | A * | 5/1996 | Jones, Jr. | C10L 3/10 |
| | | | | 96/201 |
| 9,221,694 | B1 * | 12/2015 | Govindan | C02F 5/02 |
| 9,302,974 | B1 * | 4/2016 | Shaver | C07C 51/44 |
| 9,416,088 | B1 * | 8/2016 | Shaver | C07C 51/44 |
| 10,738,268 | B2 * | 8/2020 | Leo | A23L 2/46 |
| 2011/0277633 | A1 * | 11/2011 | Sonnek | B01D 3/002 |
| | | | | 96/228 |
| 2012/0245396 | A1 * | 9/2012 | Johnston | C07C 29/76 |
| | | | | 568/885 |
| 2013/0035518 | A1 * | 2/2013 | Lee | B01D 3/143 |
| | | | | 568/885 |
| 2013/0035522 | A1 * | 2/2013 | Orosco | C07C 51/12 |
| | | | | 568/885 |
| 2014/0091010 | A1 * | 4/2014 | Banerjee | C10G 53/12 |
| | | | | 208/236 |
| 2018/0169571 | A1 * | 6/2018 | Stuckenberg | B01D 53/263 |
| 2018/0230077 | A1 * | 8/2018 | Miura | C07C 51/12 |
| 2018/0258022 | A1 * | 9/2018 | Shimizu | C07C 51/445 |
| 2018/0273459 | A1 * | 9/2018 | Shimizu | C07C 51/12 |
| 2018/0282253 | A1 * | 10/2018 | Shimizu | B01D 3/009 |
| 2019/0071383 | A1 * | 3/2019 | Min | C07C 57/04 |
| 2019/0085279 | A1 * | 3/2019 | Leo | A23L 2/56 |

* cited by examiner

```
○ ONLINE                                          QUIT 🔔1

STOPPED
                       Data View
     TAG NAME          CURRENT VALUE    EDIT ⊙
     AL_HIGH_KK_TEST   FALSE
     AL_LOW_KK_TEST    FALSE
     KK_FILL_01        1
     KK_FILL_02        2
     KK_FILL_03        3
     KK_FILL_04        4
     KK_FILL_05        5
     KK_FILL_06        6
     KK_FILL_07        7
     KK_FILL_08        8
     KK_FILL_09        9
     KK_FILL_10        10
     KK_FILL_11        11

EXIT
```

| DATE | ID# | MODE | |
|---|---|---|---|
| MON DEC 09 2019 1:39:29 PM | 1575920369B | BEER | VIEW LOG |
| MON DEC 09 2019 1:30:37 PM | 1575919837B | BEER | VIEW LOG |
| MON DEC 09 2019 1:15:25 PM | 1575918925B | BEER | VIEW LOG |
| MON DEC 09 2019 12:58:22 PM | 1575917902B | BEER | VIEW LOG |
| MON DEC 09 2019 12:56:17 PM | 1575917777B | BEER | VIEW LOG |
| MON DEC 09 2019 12:51:56 PM | 1575917516B | BEER | VIEW LOG |
| MON DEC 09 2019 12:49:38 PM | 1575917378B | BEER | VIEW LOG |
| MON DEC 09 2019 12:45:50 PM | 1575917150B | BEER | VIEW LOG |
| MON DEC 09 2019 12:42:25 PM | 1575916945B | BEER | VIEW LOG |
| MON DEC 09 2019 12:29:33 PM | 1575916173B | BEER | VIEW LOG |
| THU NOV 2019 14 4:26:45 PM | 1574770405B | BEER | VIEW LOG |
| WED NOV 13 2019 9:00:35 PM | 1573700435B | BEER | VIEW LOG |
| MON NOV 11 2019 9:19:26 PM | 1573528766C | CLEAN | VIEW LOG |

PROCESS FOR SEPARATING A FERMENTED MALT BEVERAGE

BACKGROUND

Makers of fermented beverages would like to provide high quality non-alcohol beverages. Beer brewers want to produce high-quality and full-flavored non-alcohol cereal beverages (NACBs) as well as pure and clean fermented malt beverages (FMBs). Previously this required breweries to pursue either halted fermentation, genetically modified yeast, or reverse osmosis approaches to produce NACBs. These approaches have resulted in products that do not meet the demands of consumers, in that the flavors, aromas, body and other characteristics are not comparable with those of the alcoholic versions of the beers they produce.

OVERVIEW

This document relates generally to a separation process to produce an NACB from an FMB. A method example comprises separating an input fermented malt beverage (FMB) into an output FMB and NACB, wherein the separating includes multiple stages; and adding water during the separating so that the output FMB has the same alcohol by volume (ABV) as the input FMB during each stage of the separating.

An apparatus example comprises a first separator stage to separate an input fermented malt beverage (FMB) into a first separated FMB and a first portion of a non-alcohol cereal beverage (NACB); a second separator stage to separate the first separated FMB into an output FMB and a second portion of the NACB; and a control unit. The control unit is configured to provide water to the first and second separator stages to maintain the first separated FMB and the output FMB at the same alcohol by volume (ABV) as the input FMB.

A control system example comprises a first level sensor for a first separator stage, the first separator stage to separate an input FMB into a first separated FMB and a first portion of the NACB; at least a second level sensor for a second separator stage, the second separator stage to separate the first separated FMB into an output FMB and a second portion of the NACB; and a control unit configured to monitor the first and second level sensors to provide water to the first and second separator stages, based on indications of the first and second level sensors, to maintain the first separated FMB and the output FMB at the same alcohol by volume (ABV) as the input FMB.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 15-24 are examples of display screens of a human-machine interface (HMI) for a system that separates an input FMB into an output FMB and NACB.

DETAILED DESCRIPTION

As explained previously herein, beer brewers would like to produce high-quality and full-flavored non-alcohol cereal beverages (NACBs) as well as pure and clean fermented malt beverages (FMBs). Making NACBs using either halted fermentation, genetically modified yeast, or reverse osmosis approaches to produce NACBs has not provided satisfactory results. Another approach is to use distillation to extract the alcohol from the FMB and then reconstitute the leftover beverage into a non-alcohol beverage. However, distillation requires special distillation equipment and licensure, and the resulting non-alcohol beverage has not been shown to be comparable to the alcoholic beverages produced.

The methods, devices, and systems described herein enable breweries, and especially microbreweries, to brew fully flavored alcoholic recipes in which they are expert and convert them into clear FMB and NACB versions of these beverages that meet consumer standards without requiring the brewery to have special distillation licensure or to have employees with expertise in operating distillation equipment.

Figure 1:
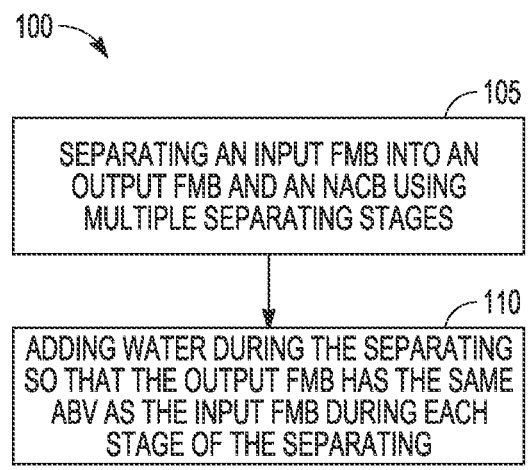
FIG. 1 is a flow diagram of a method of producing a non-alcohol cereal beverage (NACB).

FIG. 1 is a flow diagram of a method 100 of producing a NACB. The input to the separating process is an input FMB (e.g., alcoholic beer). The alcohol by volume (ABV) of the input FMB would typically be known, but the process can be performed if the ABV is not known. At 105, the input FMB is separated into an output FMB and an output NACB. The output NACB is less than 0.5% ABV, and the flavor, aroma, body, and other characteristics of the output NACB are comparable with those of the input FMB. The output FMB is a clear beverage with an ABV of the input FMB.

The separating of the input FMB includes multiple stages. At 110, water is added during the separating so that the output FMB has the same alcohol by volume (ABV) as the input FMB during each stage of the separating. At each stage of the separating, the ABV of the produced liquids is either the ABV of the input FMB or 0.5% ABV or less. Because the produced liquids are not increased to a higher ABV than the input FMB at any stage of the separation, special licensure is not needed to produce the output FMB and output NACB.

Figure 2:
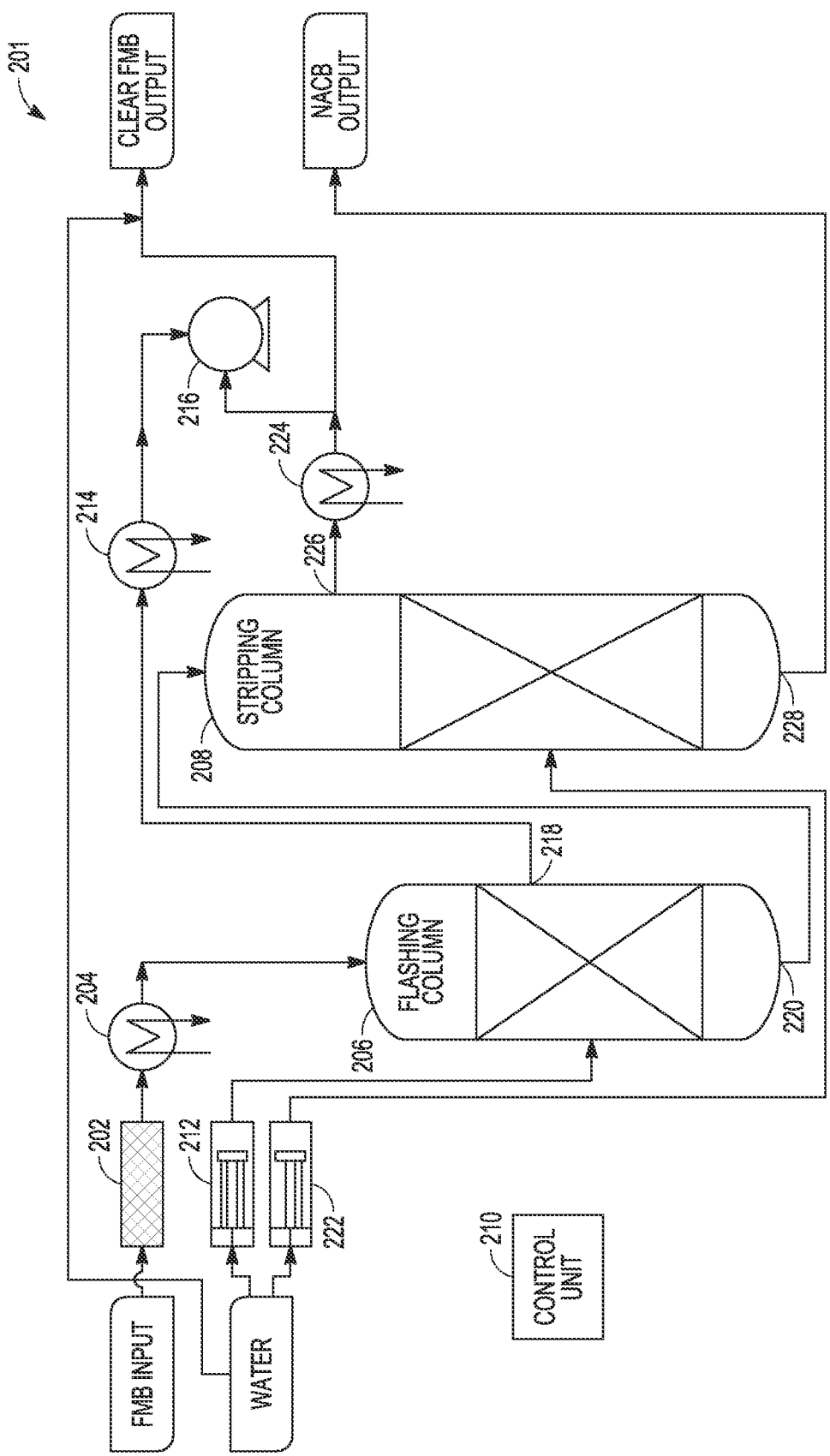
FIG. 2 is a functional block diagram of an example of a system for separating an input fermented malt beverage (FMB) into an output FMB and NACB.

FIG. 2 is a functional block diagram of an example of a system 201 for separating an input FMB (e.g., an alcohol beer) into an output FMB (e.g., a clear beverage with an ABV of the input FMB) and a NACB (e.g., a non-alcohol beer). The input FMB is typically between 4.0% and 7.5% ABV. The force driving the FMB input into the system may be carbon dioxide ($CO_2$) pressure (e.g., 10-30 pounds per square inch or 10-30 psi) provided from a tank, barrel, or keg. If the input FMB is an alcoholic beer, a defoamer may be added with the input FMB. The input FMB may be filtered (e.g., to five microns) using Filter 202 to prevent particles from entering the system. The temperature of the input FMB may be between 0° C. and 28° C.

The system in FIG. 2 includes two separator stages. The filtered input FMB may be heated using Preheater 204 to prepare it for the first separation step by the first separator stage. In variations, the input FMB is heated to about 26° C. before being fed into the first separator stage. The Preheater 204 may include a heat exchanger that heats the input FMB using a mix of glycol and water. The glycol/water is circulated through a small vessel with a heating element.

Figure 3:
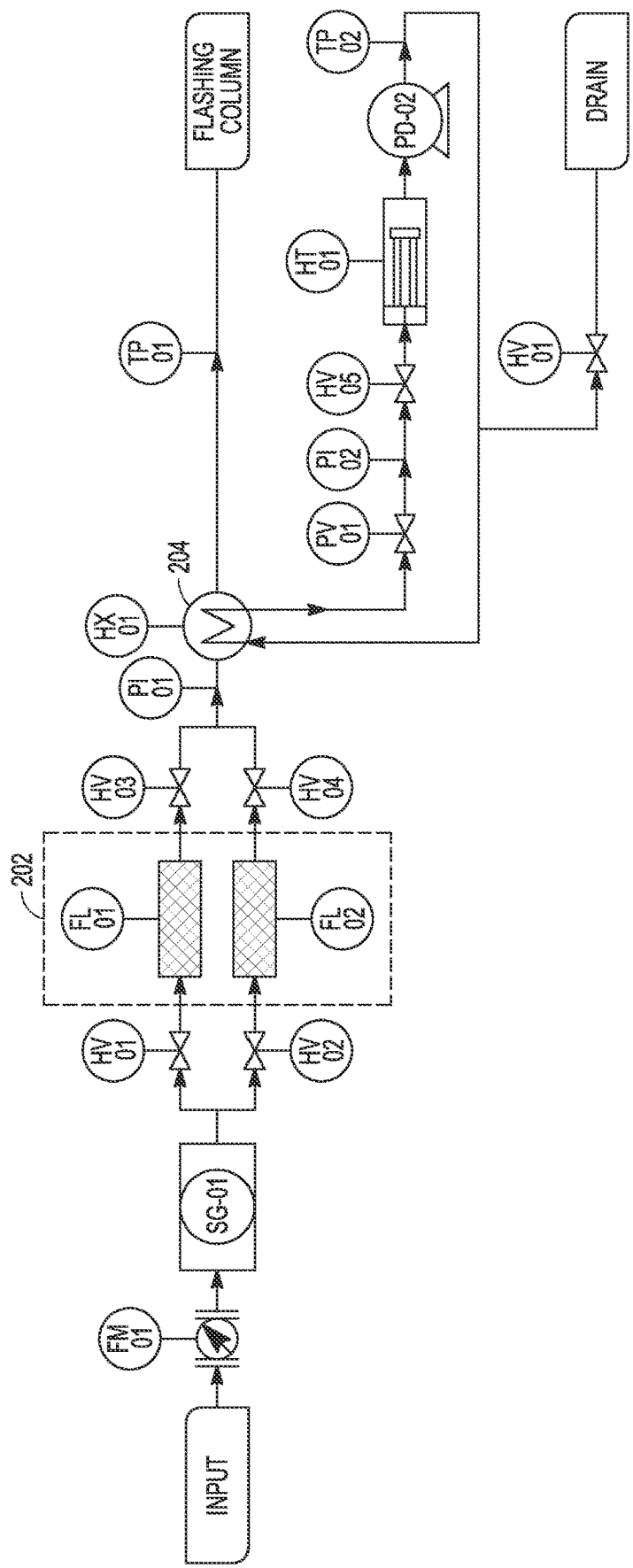
FIG. 3 is a more detailed diagram of the conditioning stage of the input FMB.

FIG. 3 is a more detailed diagram of the conditioning stage of the feed input, including a flow meter (FM01) the Filter 202, hand valves (HV01-HV05), pressure indicators (PI01, PI02), and thermocouples (TP01, TP02), and Preheater 204 including heat exchanger (HX01), pressure relief valve (PV01), pump (CP-01), and heater (HT01).

Returning to FIG. 2, Control Unit 210 can control the temperature of the input FMB. The Control Unit 210 can include programmable logic circuits and the logic circuits are configured to perform the functions described. In some examples, the Control Unit 210 can include a logic sequencer. A logic sequencer refers to a state machine or other circuit that sequentially steps through a fixed series of steps to perform one or more functions. The steps are typically implemented in hardware or firmware. In certain examples, the Control Unit 210 can include a processor such as a microprocessor, a digital signal processor, application specific integrated circuit (ASIC), or other type of processor, interpreting or executing instructions contained in software or firmware.

A temperature probe may be included on one or both of the glycol/water loop of the Preheater 204 and on the input FMB feed line. The Control Unit 210 can control the temperature of the input FMB using a proportional-integral-derivative (PID) control loop. The PID control loop may have a major loop and a minor loop. The major loop is the temperature of the input feed line and the minor loop is the temperature of the glycol and water mix.

The first separator stage separates the input FMB into a first separated FMB and a first portion or fraction of the NACB. The first separated FMB is input for separation to the second separator stage. The second separator stage separates the first separated FMB into an output FMB and a second portion of the NACB. The two portions of the NACB are combined to produce the output NACB. Adding the first portion NACB from the first separator stage back in to the second portion of the NACB helps to reproduce the same flavor and aroma of the input FMB in the resulting NACB.

Control Unit 210 controls input of mixing water to the first and second separator stages to maintain the first separated FMB and the output FMB at the same alcohol by volume (ABV) as the input FMB. In some examples, the the control unit adds water to the first and second separator stages to cause the output FMB and the combined first and second portions of the NACB to have the same volume as the input FMB. The Control Unit 210 may actuate one or more valves to introduce mixing water into the system flow.

In the example of FIG. 2, the first separator stage includes a Flashing Column 206, and the second separator stage includes a Stripping Column 208. The Flashing Column 206 and the Stripping Column 208 may be packed columns. The columns may be packed with unstructured packing such as Raschig rings or Pall rings, or the columns may be packed with one of several types of structured packing. The input FMB and the mixing water are provided to the Flashing Column 206 via one or more input ports. In certain examples, the Flashing Column 206 includes a separate input port for each of the input FMB and the mixing water. The Control Unit 210 may actuate one or more valves to add the input FMB and mixing water.

The Flashing Column 206 removes light aromatics and other components of the input FMB that have a lower boiling point than ethanol. The system includes a heater for the Flashing Column 206. In some examples, the heater includes a Flashing Column Reboiler 212 and the Flashing Column 206 is heated using low temperature steam. The steam can be created using a heating element applied to a vessel filled with water. The power fed to the heating element is based on the ABV of the input FMB. The Control Unit 210 may cycle the heating element on and off to reach an average power equal to the power desired to be input to the separation by the Flashing Column 206. The steam contacts the input FMB in the Flashing Column 206. In variations, the steam can provide the mixing water or a portion of the mixing water.

The evaporated portion produced by the Flashing Column 206 exits the column at output 218. The evaporated portion includes components separated from the input FMB. The system includes a Flashing Condenser 214. The evaporated portion is condensed into a liquid by the Condenser and the condensed liquid is added to the NACB at another point in the process. In certain examples, the Flashing Condenser 214 includes a heat exchanger fed by cold glycol. The glycol supply and return valves may be manually opened at the beginning of the process or one or more of the valves may be solenoid valves controlled by the Control Unit 210. A lights pump (not shown) may be used to remove liquid from the Flashing Condenser 214. In certain examples, the Flashing Condenser 214 includes a high level switch or sensor and the lights pump is a positive displacement (PD) pump that activates according to the output of the high level switch.

The unevaporated fraction of the input FMB exits the bottom of the Flashing Column at 220 as a liquid that is a first separated FMB. The system may include a bottoms pump (not shown) to remove the first separated FMB from the flashing column. The bottoms pump may be a PD pump controlled using a low level switch and a high level switch within the flashing column. The switches include sensors to detect the level of the liquid in the column. The bottoms pump is either off (both level switches off), on at low speed (only low level switch on), or on at high speed (both level switches on) based on the two level switches. The separation between the low level switch and the high level switch may be one to two inches.

The separation by the Flashing Column 206 is performed under vacuum pressure pulled using Vacuum Pump 216. In certain examples, the target pressure for vacuum produced in the Flashing Column 206 is 24 Torr. The Control Unit 210 operates a vacuum regulator to regulate the vacuum to the target pressure.

Figure 4:
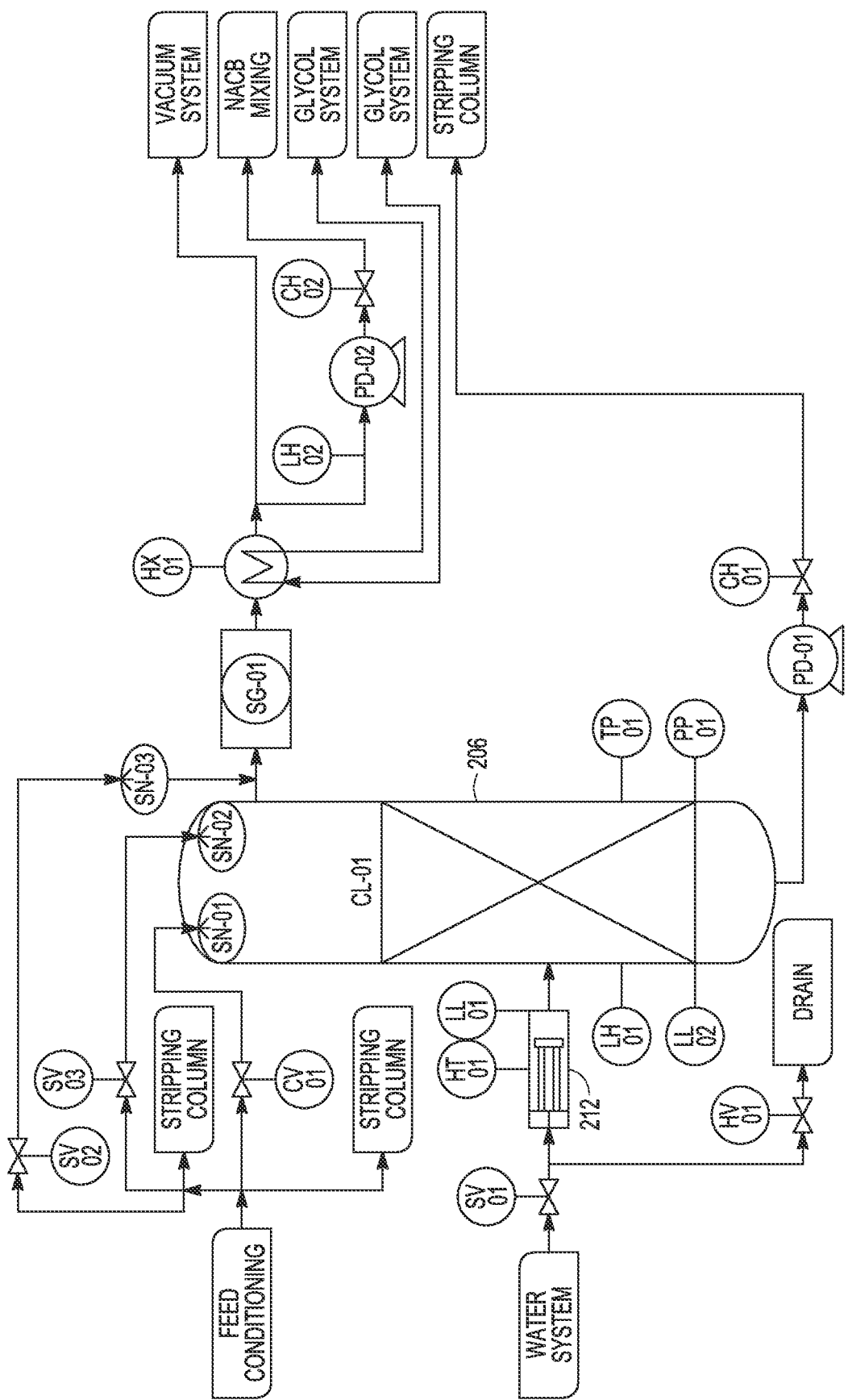
FIG. 4 is a more detailed diagram of the first separator stage.

FIG. 4 is a more detailed diagram of the first separator stage including the Flashing Column 206, Flashing Column Reboiler 212, solenoid valves (SV01-SV03), spray nozzles (SN01-SN03), level sensors (LH01, LL01), sight glass (SG01), bottoms PD pump (PD-01), pressure probe (PP01), thermocouple (TP01), check valves (CH01-CH02) and the Flashing Condenser including heat exchanger (HX01), and lights PD pump (PD-02). Also shown are the connections to the Stripping Column, Vacuum System, Glycol System, and the Water System.

Returning to FIG. 2, the first separated FMB produced by the Flashing Column 206 is provided as input to the Stripping Column 208. The Stripping Column 208 separates the ethanol from the first separated FMB. The separation in the Stripping Column is controlled similarly to the flashing column but with different set points for energy input and pressure. The system includes a heater for the Stripping Column 208. In some examples, the heater includes a Stripping Column Reboiler 222 and the Stripping Column is heated using low temperature steam. The Control Unit 210 may cycle the heating element of the Stripping Column Reboiler 222. The heating of the Stripping Column 208 is performed under vacuum pressure pulled using Vacuum Pump 216. In certain examples, the target pressure for vacuum produced in the Stripping Column 208 is 18 Torr. The Control Unit 210 operates a vacuum regulator to regulate the vacuum to the target pressure. The water and ethanol separated from the Stripping Column 208 exits the top of the Stripping Column at output 226. The remaining unevaporated portion exits the Stripping Column at a second output 228.

The evaporated water and ethanol mixture leaving the Stripping Column 208 is condensed to a liquid using Stripping Condenser 224. As with the flashing column condenser 214, the Stripping Condenser 224 may include a heat exchanger fed by cold glycol. A lights pump (not shown) may be used to remove liquid from the Stripping Condenser 224. Makeup water is added to the condensed water and ethanol liquid to maintain the ABV at the ABV of the input FMB. The ethanol, water and makeup water mixture is the output FMB. The output FMB is a clear beverage with an ABV of the input FMB. The output FMB may be carbonated during the process (e.g., by using compressed $CO_2$) to create hard seltzer, or the output FMB may be carbonated later.

The makeup water can be added at the output of the Stripping Column. The system can include two flow meters (not shown); one to monitor input flow and the other to monitor the water and ethanol flow. The Control Unit 210 monitors the difference between the two flows to determine the amount of makeup water to add. In certain examples, the system includes a PD pump and solenoid valve to add the makeup water. The Control Unit 210 controls the PD pump and solenoid valve to pulse the determined amount of makeup water into the water and ethanol output stream.

The unevaporated portion from the Stripping Column 208 exits the bottom of the stripping column 208 at output 228. A bottoms pump may be used to remove the unevaporated portion form the stripping column 208. This unevaporated portion is output as a liquid and has an ABV less than 0.5%. This unevaporated portion exiting the Stripping Column is combined with the liquid condensed from the evaporated portion that exits the flashing column to form the NACB output. The flow rate of the system may be 22-39 gallons per hour (GPH) depending on the ABV of the input FMB.

Figure 5:
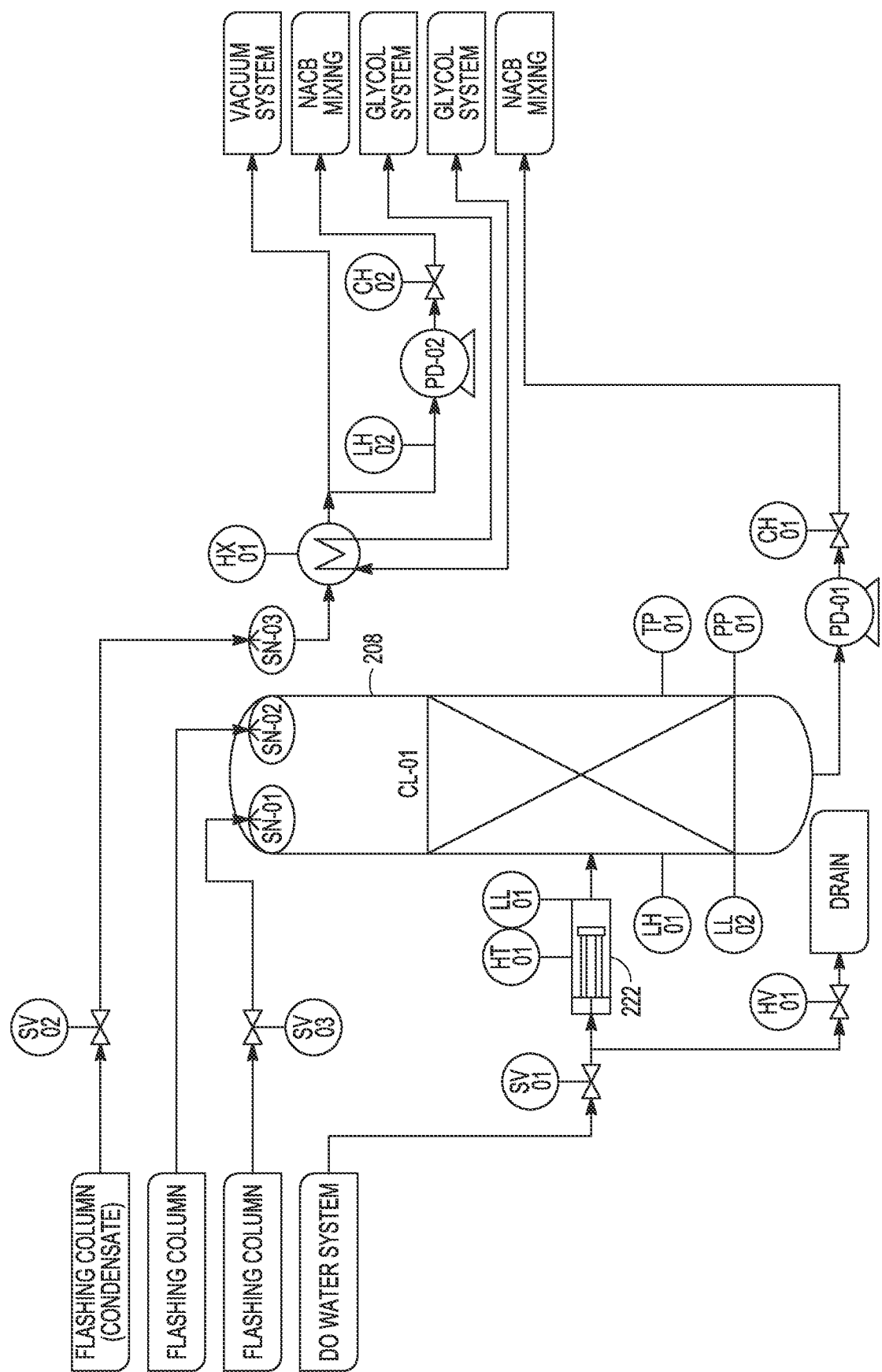
FIG. 5 is a more detailed diagram of the second separator stage.

FIG. 5 is a more detailed diagram of the second separator stage including the Stripping Column 208, Stripping Column Reboiler 222, solenoid valves (SV01-SV03), spray nozzles (SN01-SN03), level sensors (LH01, LL01), bottoms PD pump (PD-01), pressure probe (PP01), thermocouple (TP01), check valves (CH01-CH02) and the Stripping Condenser including heat exchanger (HX01), and lights PD pump (PD-02). Also shown are the connections to the Flashing Column, Water System, Vacuum System, Glycol System, and the NACB Mixing.

Figure 6:
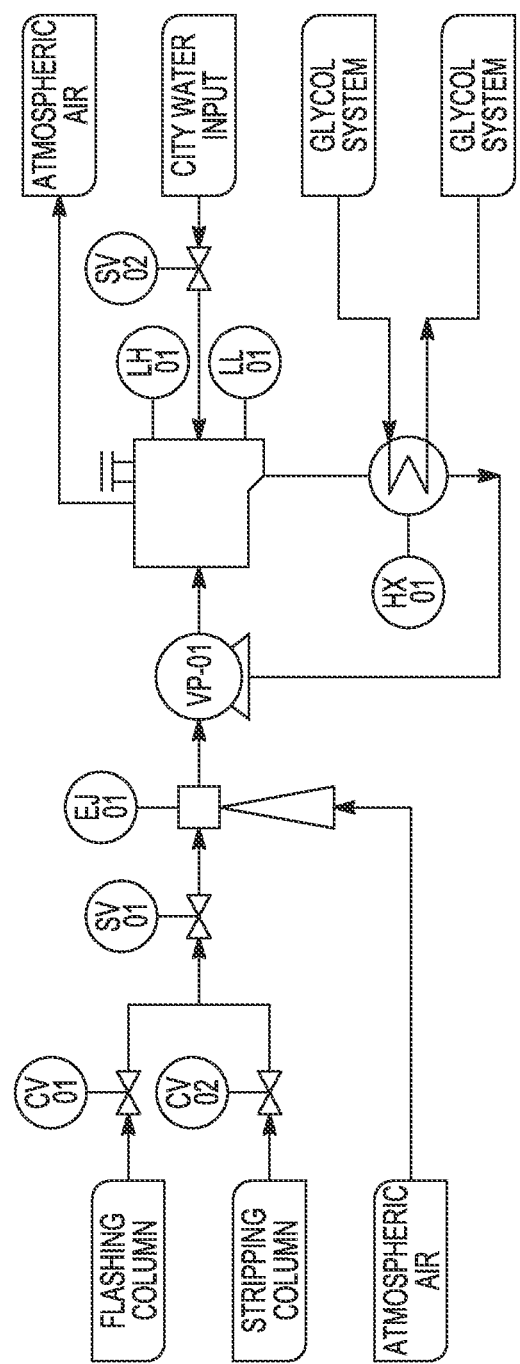
FIG. 6 is a more detailed diagram of the Vacuum System.
Figure 7:
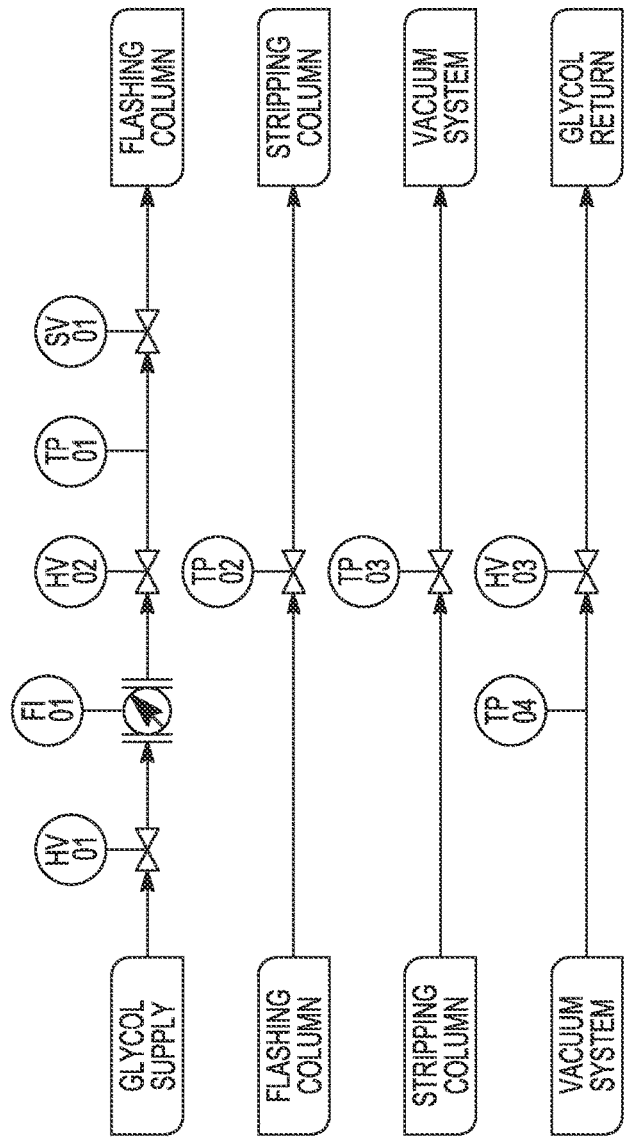
FIG. 7 is a diagram showing the Glycol System.
Figure 8:
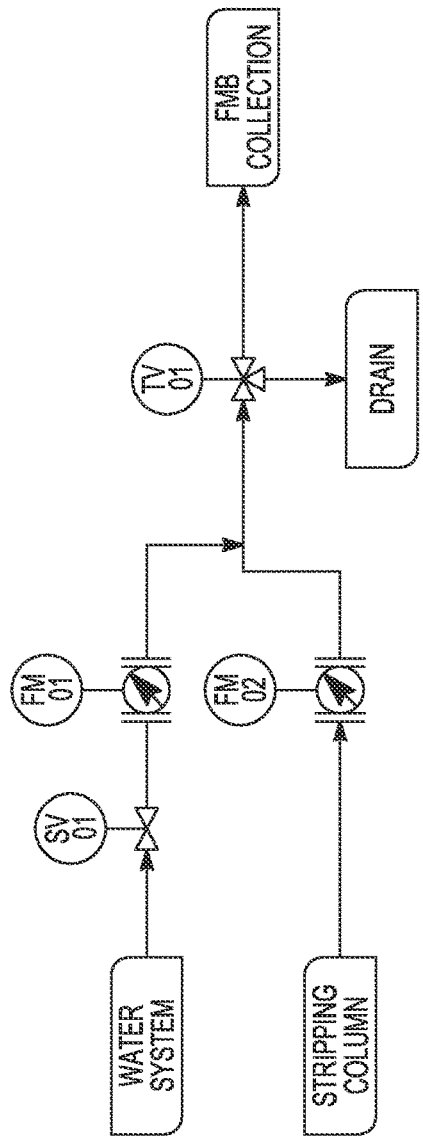
FIG. 8 is a diagram showing the collection of the output FMB.
Figure 9:
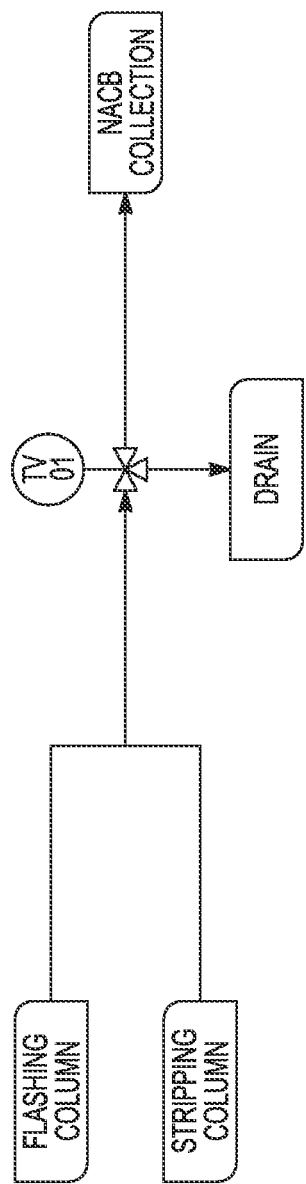
FIG. 9 is a diagram showing the collection of the output NACB.
Figure 10:
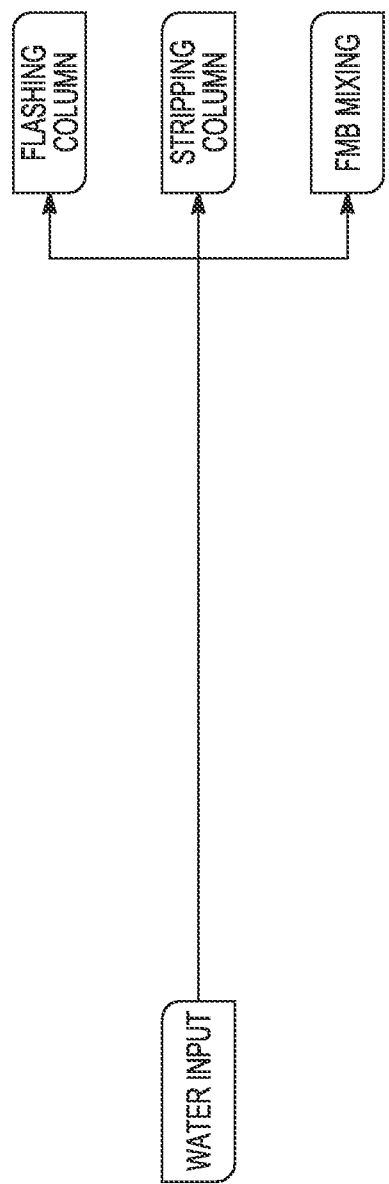
FIG. 10 is a diagram of the Water System.
Figure 11:
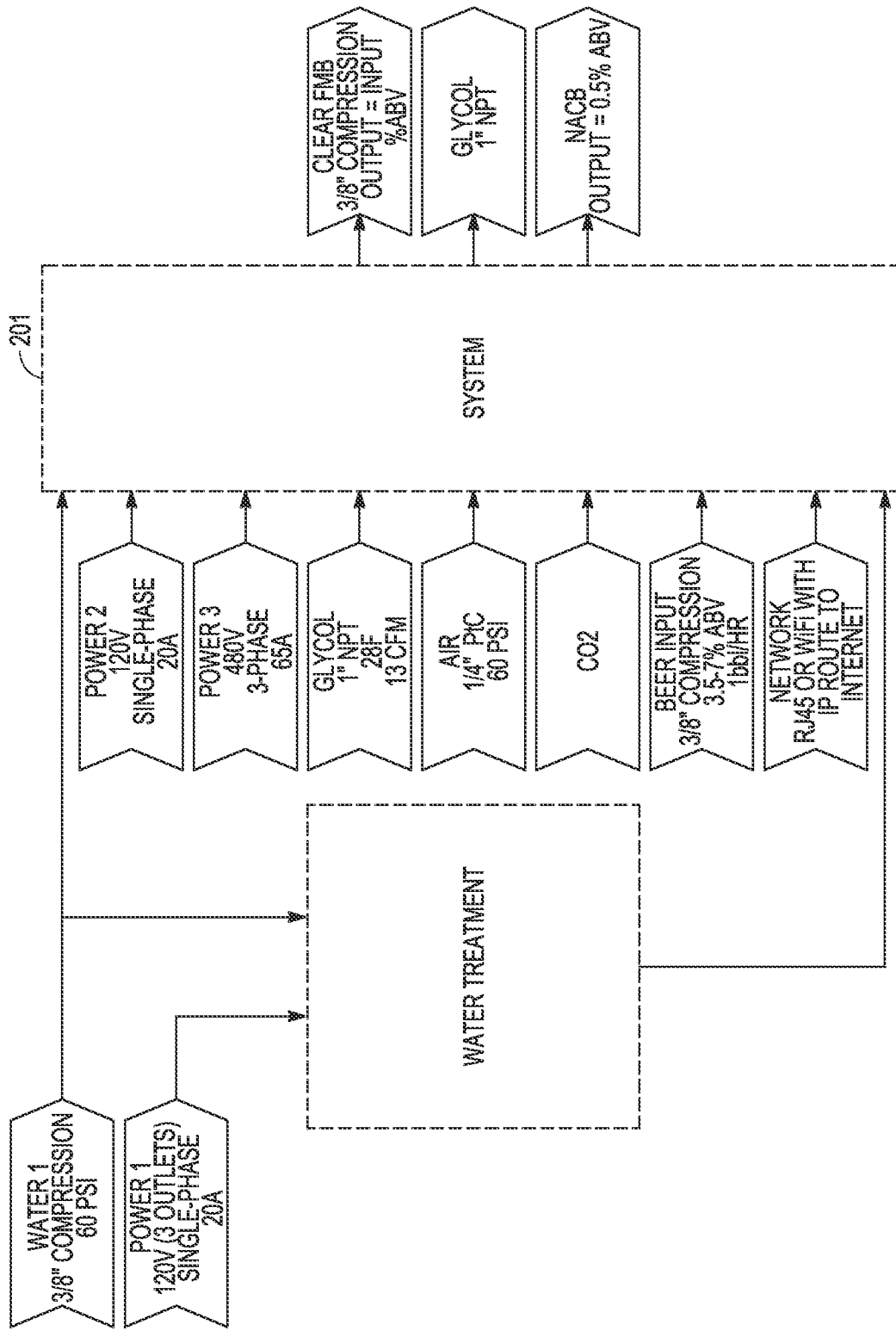
FIG. 11 is a diagram showing a summary of the Utilities Input into the example separation system of FIG. 2.

FIG. 6 is a more detailed diagram of the Vacuum System including the vacuum pump (VP01), level sensors (LL01, LH01), and heat exchanger (HX01). FIG. 7 is a diagram showing the Glycol System and the connections of the Glycol Supply to the Flashing Column, Stripping Column, and Vacuum System. FIG. 8 is a diagram showing the collection of the output FMB and the connections to the output of the Stripping Column and the water system. FIG. 9 is a diagram showing the collection of the first portion of the NACB from the flashing column and the second portion of the NACB from the Stripping Column combined to form the output NACB. FIG. 10 is a diagram of the connection of the water system to the Flashing Column, the Stripping Column, and the FMB Mixing. FIG. 11 is a diagram showing a summary of the Utilities Input into the separation system 201 of FIG. 2.

Figure 12:
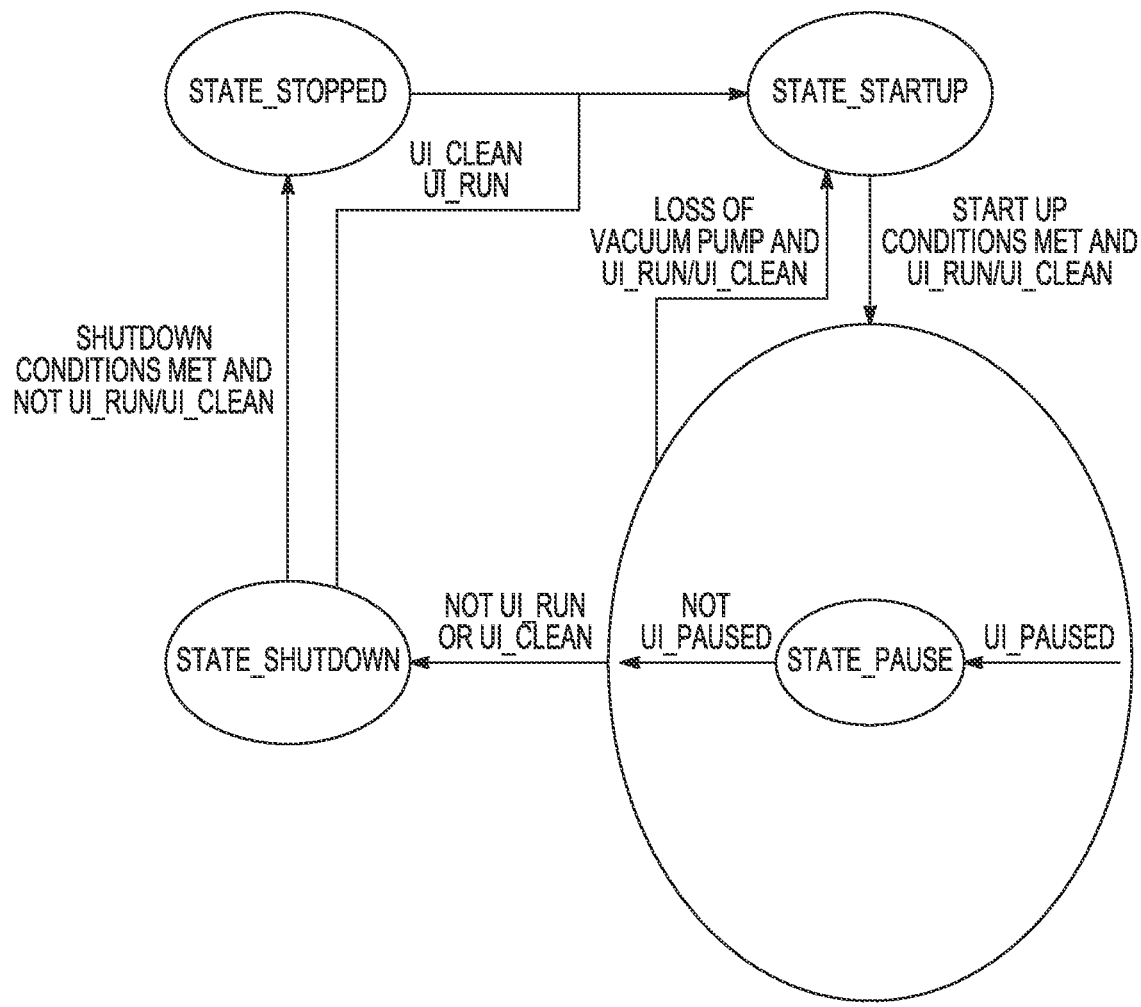
FIG. 12 is an example of a state diagram for a system for separating an input FMB into an output FMB and NACB.

FIG. 12 is an example of a state diagram for a system for separating an input FMB into an output FMB and NACB (e.g., the system 201 of FIG. 2). The state diagram includes five states: Stopped, Startup, Running, Running-Paused, and Shutdown. The states include the operating parameters associated with the run mode operations described previously herein. Transitions among states can be initiated by system alerts or by input received by a user interface (UI). Additionally, each of the states can have a clean mode as well as a run mode. In clean mode, the target pressure is 260 Torr for the Flashing Column and the Stripping Column to purge the contents of the columns and lines.

Figure 13:
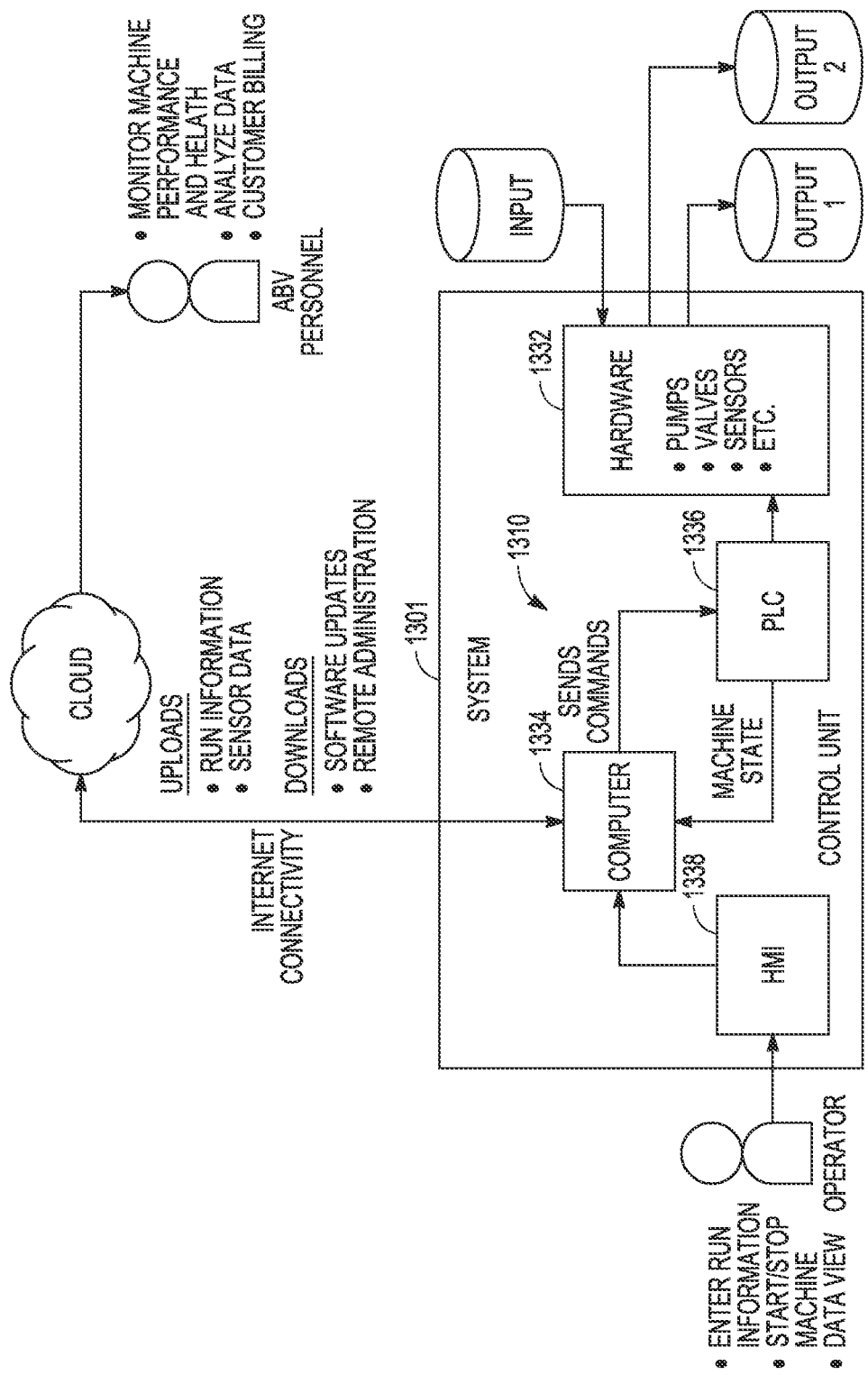
FIG. 13 is a block diagram of an example of a control subsystem for a system that separates an input FMB into an output FMB and NACB.

FIG. 13 is a block diagram of an example of a control subsystem for a system 1301 that separates an input FMB into an output FMB and NACB (e.g., the system 201 of FIG. 2). The system 1301 includes a Control Unit 1310 and system hardware 1332. The system hardware includes the controllable pumps and valves described previously herein to control the operation of system 1301, and includes the sensors (e.g., sensors for level, temperature, pressure, etc.) described previously herein to monitor the operating parameters of the system 1301. The Control Unit 1310 includes computing circuitry 1334, a programmable logic controller (PLC 1336), and a human-machine interface (HMI 1338). The PLC may perform the example state machine shown in FIG. 12 and may provide the control signal for the pumps and valves.

The computing circuitry 1334 may include a processor that executes instructions in software or firmware to perform the functions described. Using the input from an operator, the computing circuitry 1334 calculates how much energy is to be delivered to the heaters of the flashing column and the stripping column. The computing circuitry 1334 may also calculate the expected output volume and may calculate the amount of mixing water to add to the process flow to maintain the ABV of the liquids at the ABV of the input FMB.

Figure 14:
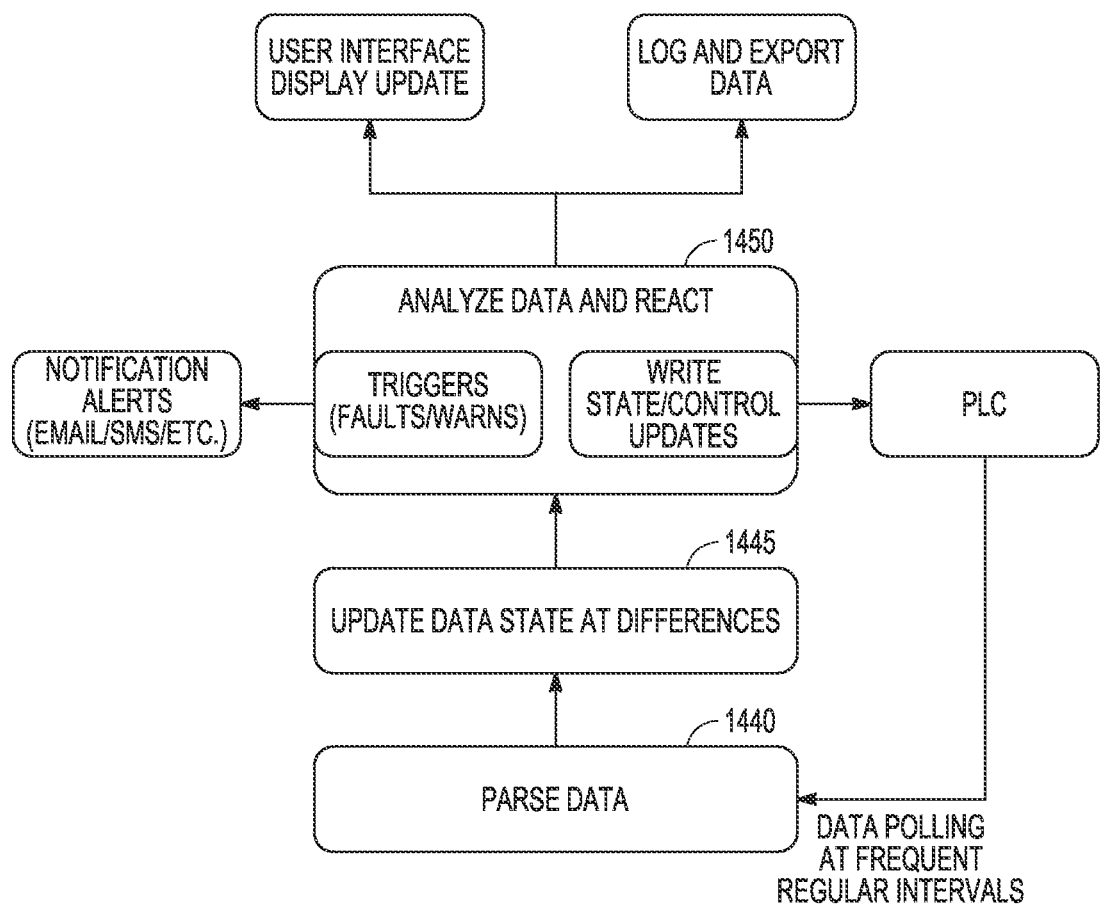
FIG. 14 is a block diagram of an example of data processing performed by a control subsystem for a system that separates an input FMB into an output FMB and NACB.

FIG. 14 is a block diagram of an example of data processing performed by a control subsystem of the system of FIG. 13. The performance of the functional blocks of the data processing can be by the computing circuitry, the HMI, or the performance of the functions can be divided between the computing circuitry and the HMI. At 1440, data from the PLC is parsed. At 1445, the state of the data is updated when differences are detected. At 1450, the data is analyzed. Based on the data, the state of the PLC may be updated. One or more of the computing circuitry, the PLC, and HMI may monitor the data for system faults or alerts, or for other system notices at 1415.

Figure 15:
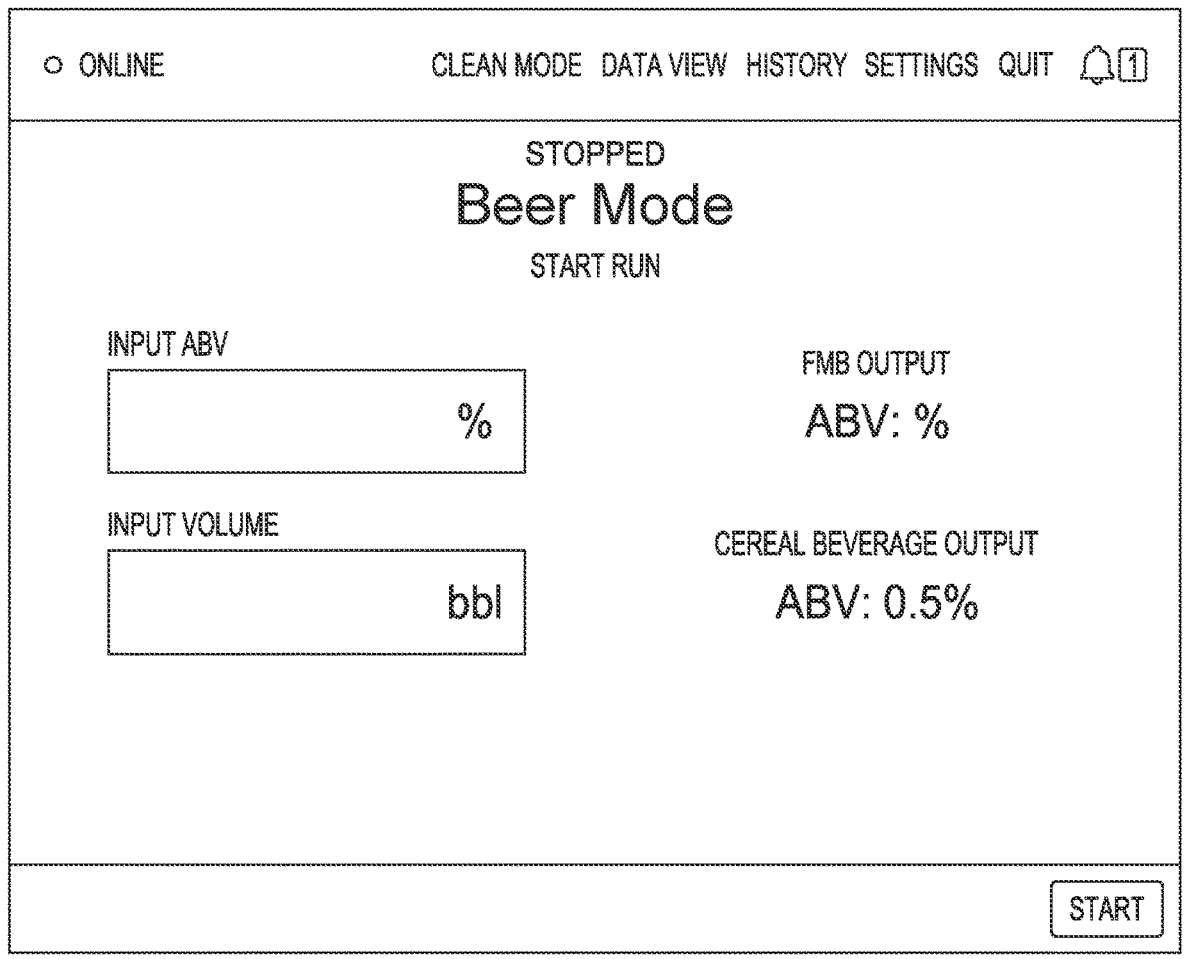

Returning to FIG. 13, the HMI 1338 receives input from an operator and provides data of the process to the operator. FIG. 15 is an example of an interface screen of the HMI 1338. The operator inputs the ABV of the input FMB and the volume (e.g., in barrels or bbl). The interface screen also shows a start/stop button.

Figure 16:
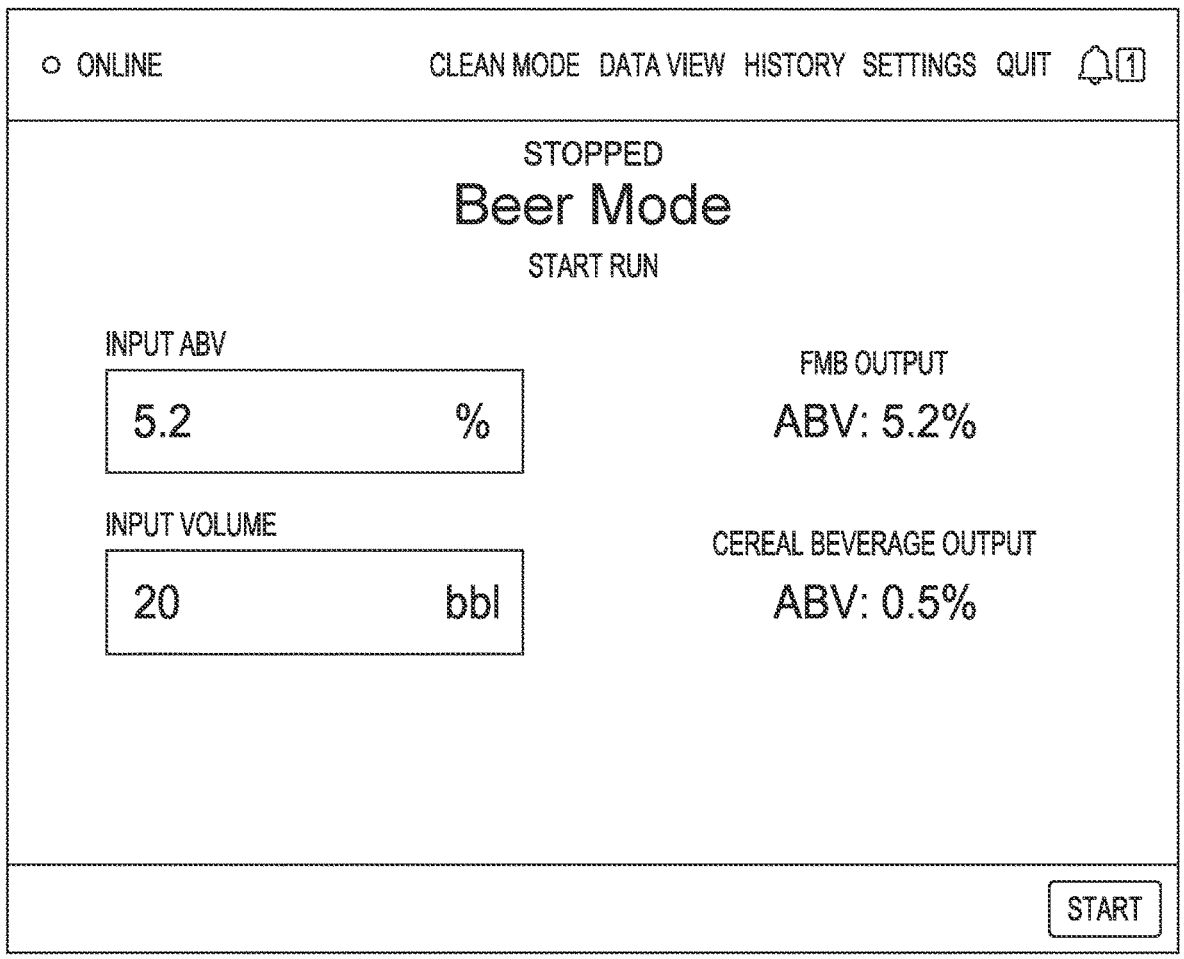

FIG. 16 is an example of a populated interface screen of the HMI in which the operator specified an ABV of 5.2% for the input FMB and an input volume of 20 bbl. The screen indicates to the operator that the output FMB will have the same ABV as the input FMB and the NACB will have an ABV of 0.5% or less.

Figure 17:
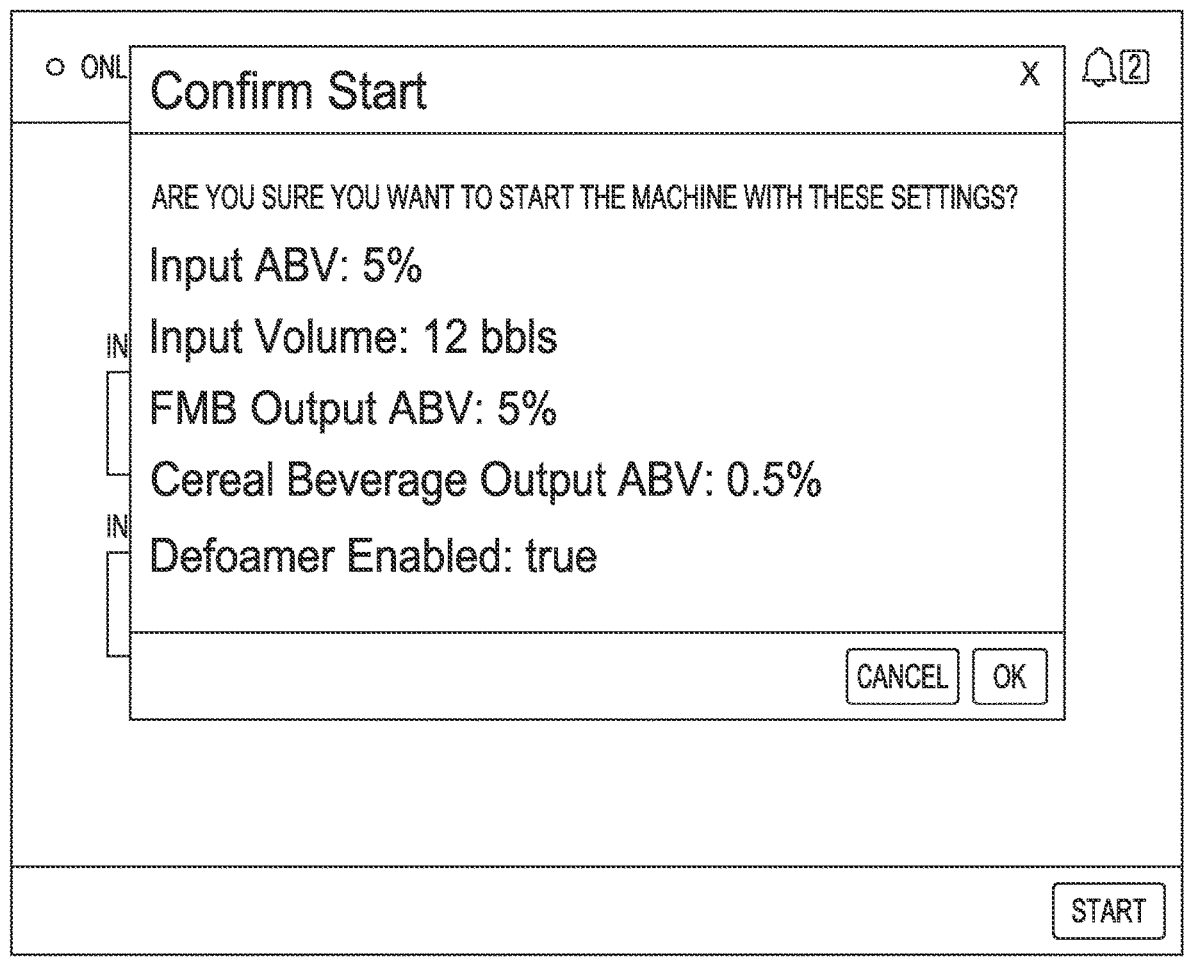
Figure 18:
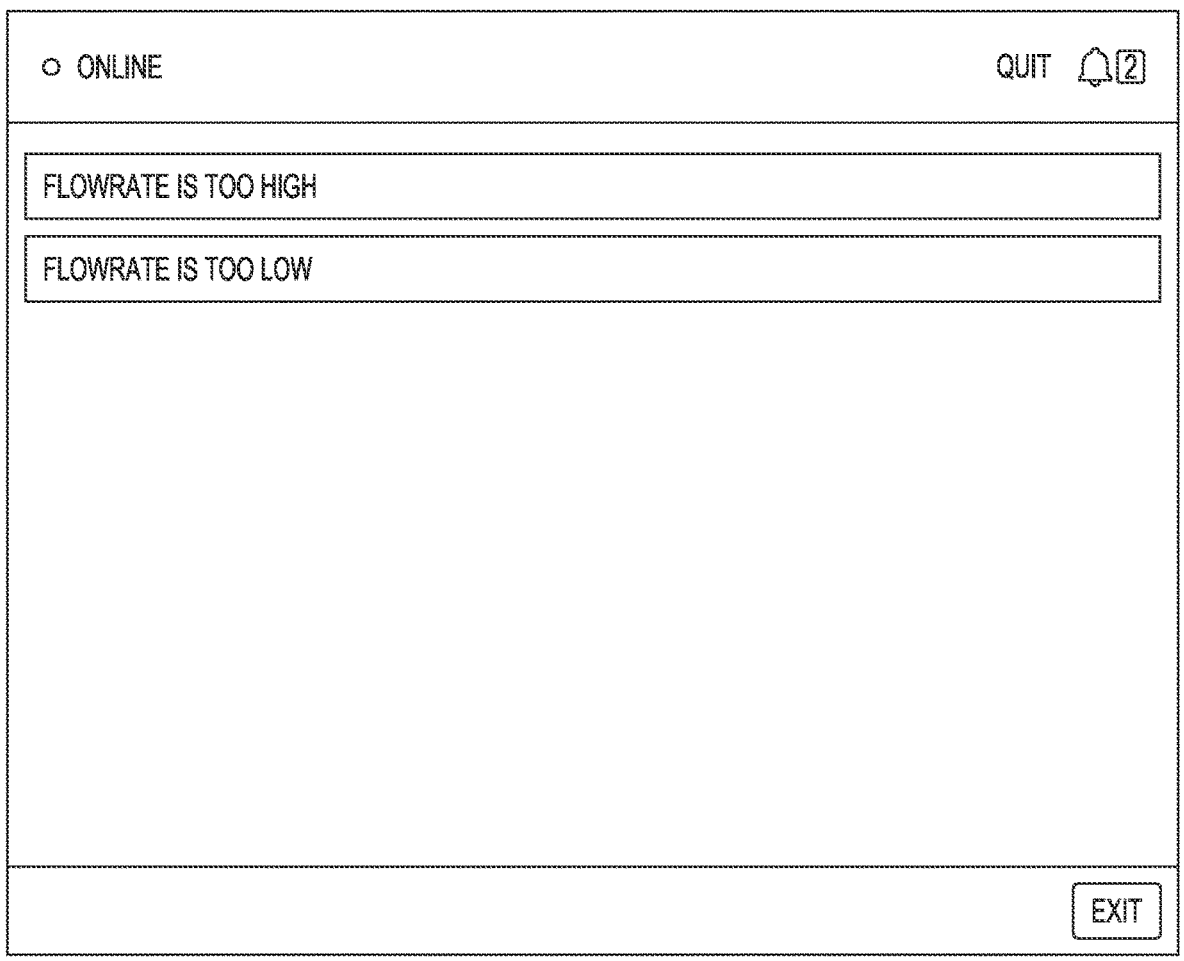
Figure 20:
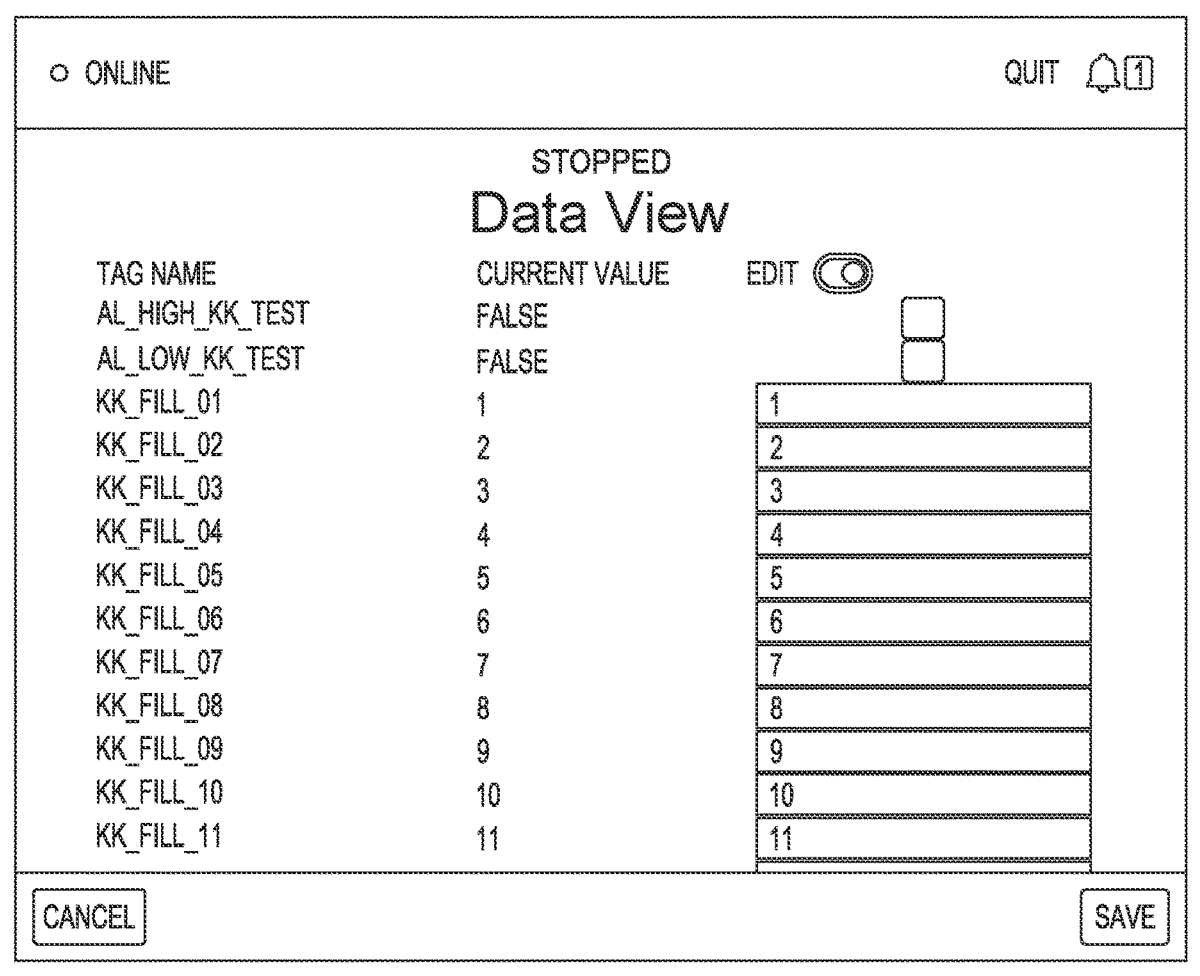

FIG. 17 is another example of an interface screen of the HMI 1338. The system may give the option for the operator to confirm the desired settings before the separating process is started. In certain examples, the system may provide an option to run the system at a lower or higher temperature, and the interface screen may include a field to receive a temperature choice from the operator. FIG. 18 is another example of an interface screen of the HMI showing alerts related to flow rate. FIG. 19 shows an example of an interface data screen with data taken during a separating process. FIG. 20 shows the interface data screen in edit mode.

Figure 21:
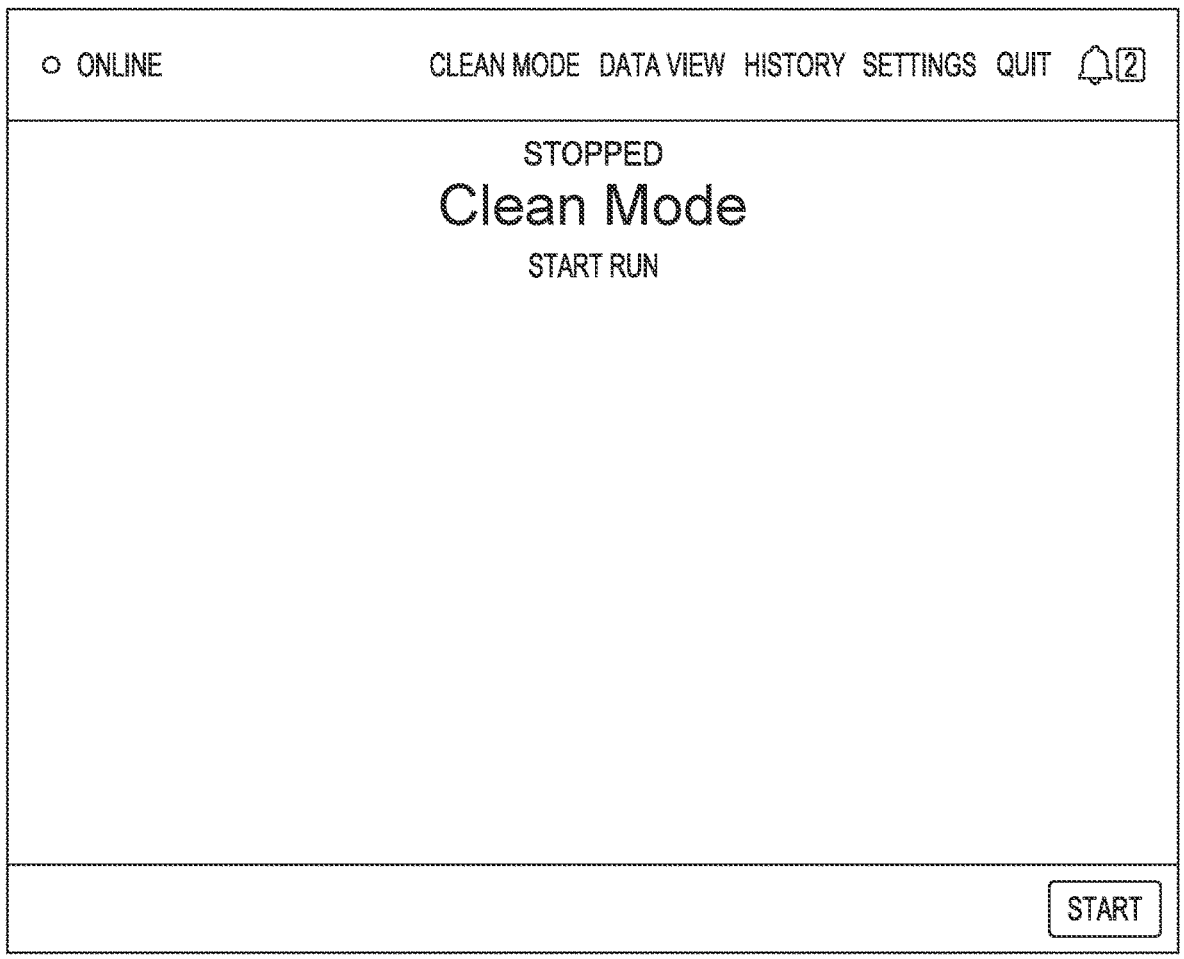
Figure 22:
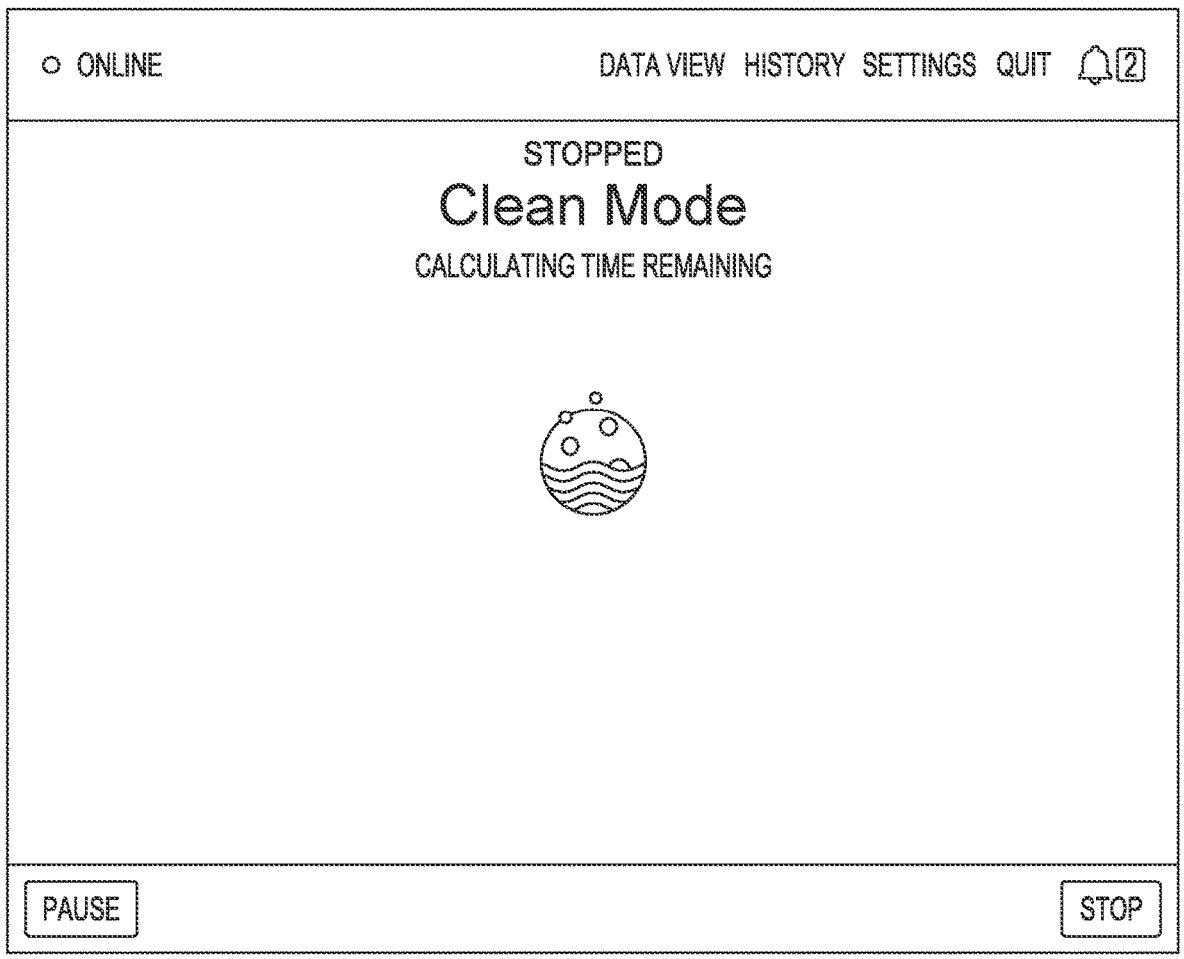

As explained previously herein, the system 1301 in FIG. 13 can be run in clean mode. FIG. 21 is an example of an interface screen to start the clean mode and FIG. 22 is an example of an interface screen of the HMI 438 showing running of clean mode.

Figure 23:
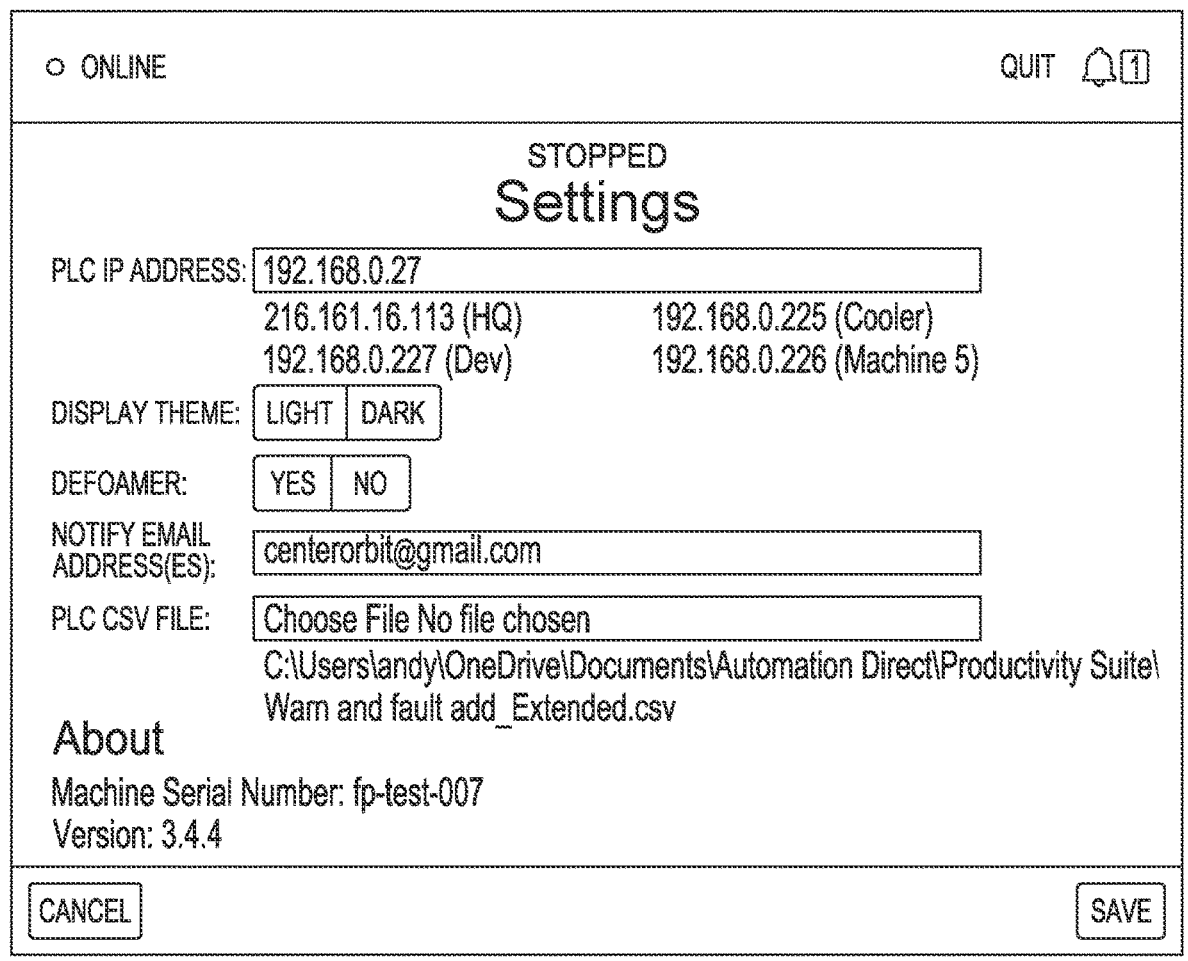

FIG. 13 shows that the computing circuitry 1334 may have a connection to the Internet. Run time information can be uploaded to the Cloud for storage. The information can include settings and sensor data. FIG. 23 is an example of an interface screen showing settings used to perform a separation process. The settings can be stored in the Cloud for later download and can be used again for separating another batch of input FMB. FIG. 24 shows that batch histories can be stored and retrieved later by operators. The connection to the Internet can allow personnel to monitor the system remotely, and to perform system administration remotely. For example, updates to software can be installed remotely.

Figure 25:
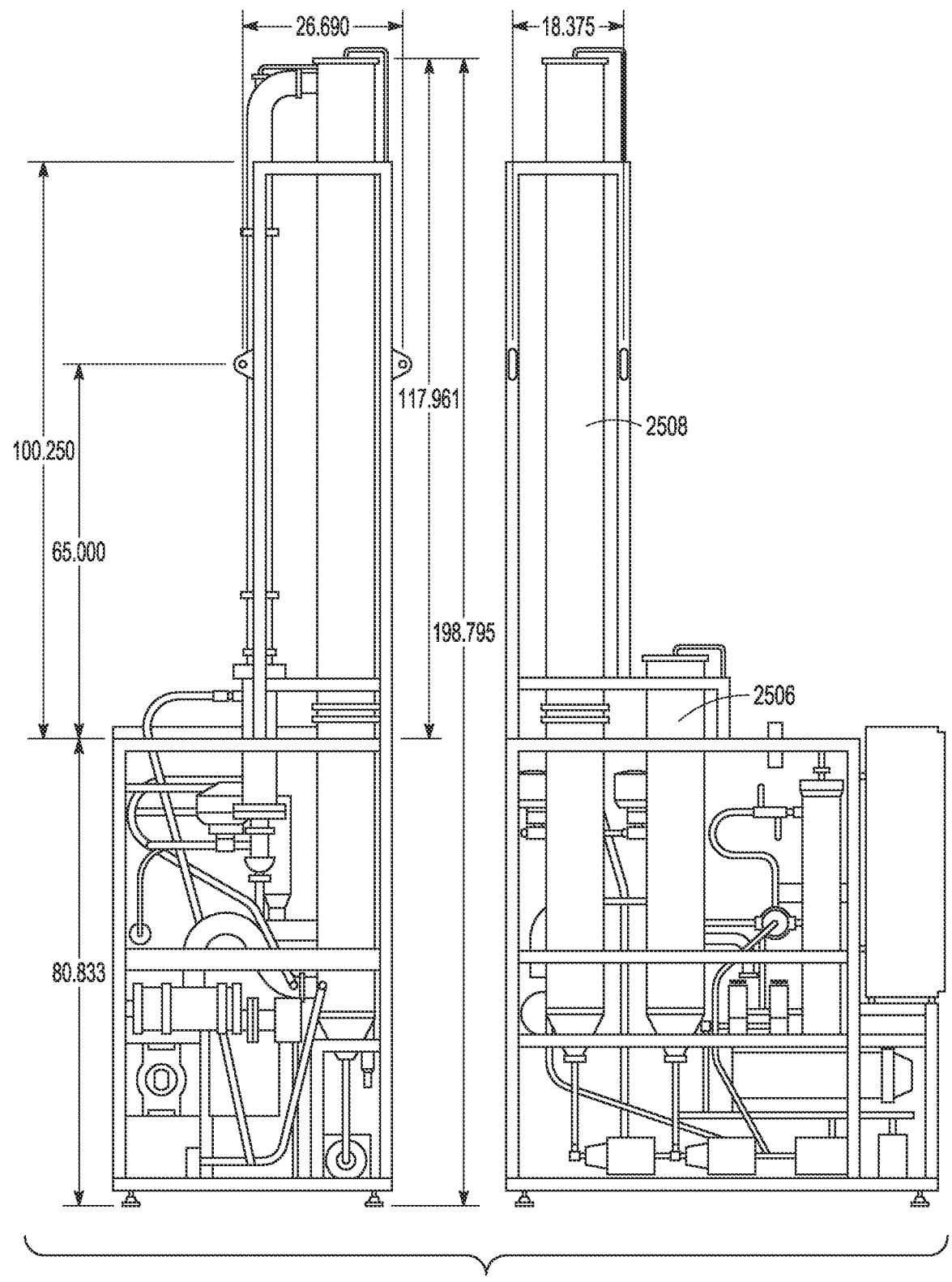
FIGS. 25 and 26 show an example of an implementation of a system for separating an input FMB into an output FMB and NACB.
Figure 26:
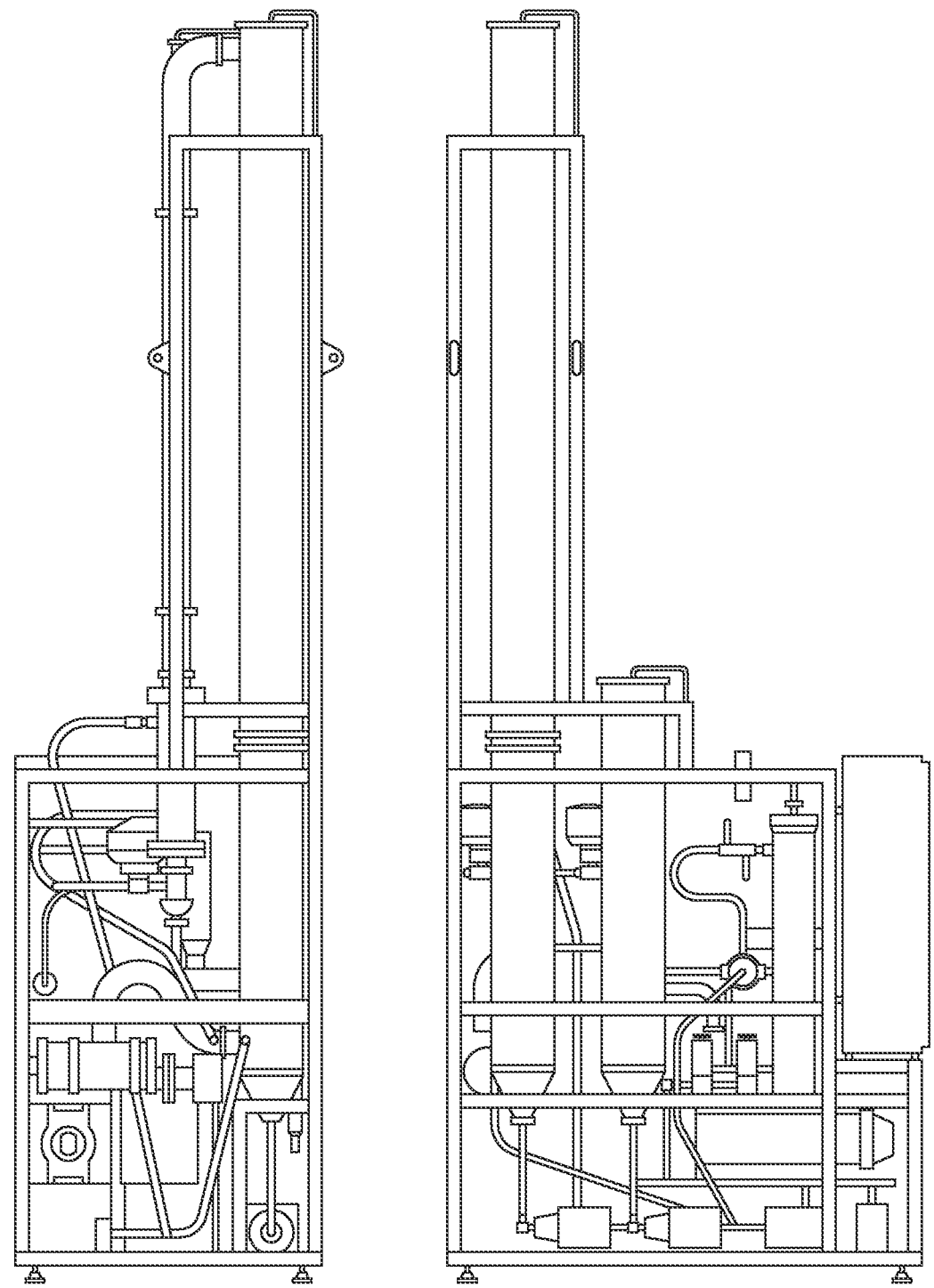

FIG. 25 shows an assembly drawing of an example of an implementation of a system for separating an input FMB into an output FMB and NACB. The Flashing Column 2506 and Stripping Column 2508 can be seen in the drawing. FIG. 26 is a digital rendering of the implementation. The devices, methods, and systems described herein can be used to separate an input FMB into an output FMB and a NACB. The ABV of the produced output FMB is the same as the ABV of the input FMB, and the ABV of the NACB is 0.5% or less. The volume of each of the output FMB and NACB produced by the separation can be the same as the volume of the input FMB. The resulting NACB is comparable to the alcoholic input FMB.

ADDITIONAL DESCRIPTION AND EXAMPLES

Example 1 includes subject matter, such as a method of producing a non-alcohol cereal beverage (NACB), comprising separating an input fermented malt beverage (FMB) into an output FMB and the NACB, wherein the separating includes multiple stages; and adding water during the separating so that the output FMB has the same alcohol by volume (ABV) as the input FMB during each stage of the separating.

In Example 2, the subject matter of Example 1 optionally includes adding water during the separating so that the output FMB and the output NACB each has the same volume as the input FMB.

In Example 3, the subject matter of one or both of Examples 1 and 2 optionally includes evaporating the input FMB during a first stage of the separating to create a first evaporated portion and a first unevaporated portion, wherein the first unevaporated portion has the ABV of the input FMB; evaporating the first unevaporated portion during a subsequent stage of the separating to form a second evaporated portion and a second unevaporated portion; condensing the second evaporated portion to produce the output FMB, wherein the condensed second evaporated portion has an ABV equal to the input FMB and the second unevaporated portion has an ABV of 0.5 percent or less; and condensing the first evaporated portion and combining the condensed first evaporated portion and the second unevaporated portion to produce the NACB.

In Example 4, the subject matter of Example 3 optionally includes performing the evaporating of the input FMB and the first unevaporated portion with heating under vacuum pressure.

In Example 5, the subject matter of Example 4 optionally includes creating a flow rate using carbon dioxide and the vacuum pressure, wherein the flow rate and heating maintain the first unevaporated portion and the output FMB at the same ABV as the input FMB.

In Example 6, the subject matter of any combination of Examples 3-5 optionally includes the first evaporated portion including components separated from the input FMB that have a boiling point lower than ethanol.

In Example 7, the subject matter of one or any combination of Examples 1-6 optionally includes the output FMB is a substantially clear beverage.

Example 8 can include subject matter (such as an apparatus) or can optionally be combined with one or any combination of Example 1-7 to include such subject matter, comprising a first separator stage to separate an input fermented malt beverage (FMB) into a first separated FMB and a first portion of a non-alcohol cereal beverage (NACB), a second separator stage to separate the first separated FMB into an output FMB and a second portion of the NACB, and a control unit configured to provide water to the first and second separator stages to maintain the separated FMB and the output FMB at the same alcohol by volume (ABV) as the input FMB.

In Example 9, the subject matter of Example 8 optionally includes a control unit configured to add water to the first and second separator stages to cause the output FMB and combined first and second portions of the NACB to have the same volume as the input FMB.

In Example 10, the subject matter of one or both of Examples 8 and 9 optionally include a first separator stage including a first packed column including: at least one input port to receive the input FMB and to receive water; a first output port to provide the first NACB portion; and a second output port to provide the first separated FMB, and a second separator stage including a second packed column including: at least one input port to receive the first separated FMB and to receive water; a first output port to provide the second NACB portion; and a second output port to provide the output FMB.

In Example 11, the subject matter of Example 10 optionally includes at least one vacuum pump coupled to the first and second packed columns and a control unit configured to control input of carbon dioxide and vacuum pressure to produce a flow rate that maintains the output FMB at the same ABV as the input FMB.

In Example 12, the subject matter of Example 11 optionally includes at least one heat source coupled to the first and second packed columns, a first condenser coupled to the first output port of the first packed column, and the first portion of the NACB is produced by evaporation in the first packed column using the heat source and condensation by the first condenser, and a second condenser coupled to the second output of the second packed column, and the output FMB is produced by evaporation in the second packed column using the heat source and condensation by the second condenser.

In Example 13, the subject matter of one or any combination of Examples 8-12 optionally includes second separator stage that produces an output FMB that is a substantially clear beverage.

In Example 14, the subject matter of one or any combination of Examples 8-13 optionally includes a first separator stage produces a first portion of the NACB that includes components separated from the input FMB that have a boiling point lower than ethanol.

In Example 15, the subject matter of Example 14 optionally includes the first and second portions of the NACB being combined to produce a combined output NACB that is less than 0.5% ABV.

In Example 16, the subject matter of one or any combination of Examples 8-15 optionally includes a filter arranged prior to the first separator stage to filter the input FMB prior to the first separator stage, and a heat source coupled to the filter to heat the filtered input FMB prior to the first separator stage.

Example 17 includes subject matter (such as a control system for an apparatus that produces a non-alcohol cereal beverage (NACB) from a fermented malt beverage (FMB)) or can optionally be combined with one or any combination of Examples 1-16 to include such subject matter, comprising at least a first level sensor for a first separator stage, the first separator stage to separate an input FMB into a first separated FMB and a first portion of the NACB, at least a second level sensor for a second separator stage, the second separator stage to separate the first separated FMB into an output FMB and a second portion of the NACB, and a control unit configured to monitor the level sensors to provide water to the first and second separator stages, based on indications of the first and second level sensors, to maintain the first separated FMB and the output FMB at the same alcohol by volume (ABV) as the input FMB.

In Example 18, the subject matter of Example 17 optionally includes a control unit configured to monitor the level sensors to provide water to the first and second separator stages, based on indications of the level sensors, to produce the output FMB and the NACB each with a volume the same as the volume of the input FMB.

In Example 19, the subject matter of one or both of Examples 17 and 18 optionally includes a first pressure sensor for the first separator stage, a second pressure sensor for the second separator stage, a vacuum pump coupled to the first and second separator stages, and a control unit configured to control operation of the vacuum pump to adjust pressure in the first and second separator stages to produce a flow rate, based on indications from the first and second pressure sensors and the indications from the first and second level sensors, that maintains the output FMB at the same ABV as the input FMB.

In Example 20, the subject matter of Example 19 optionally includes a first temperature sensor for the first separator stage, a second temperature sensor for the second separator stage, at least one heat source coupled to the first and second separator stages, and a control unit is configured to control operation of the at least one heat source and the vacuum pump to adjust pressure and temperature of the first and second to produce the flow rate that maintains the output FMB at the same ABV as the input FMB.

These non-limiting Examples can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An apparatus comprising:
   a first separator stage to separate an input fermented malt beverage (FMB) into a first separated FMB and a first portion of a non-alcohol cereal beverage (NACB), the first separator stage comprising:
   a first packed column including:
   at least one input port to receive the input FMB and to receive water;
   a first output port to provide the first NACB portion; and
   a second output port to provide the first separated FMB;
   a second separator stage to separate the first separated FMB into an output FMB and a second portion of the NACB, the second separator stage comprising:
   a second packed column including:
   at least one input port to receive the first separated FMB and to receive water;
   a first output port to provide the second NACB portion; and
   a second output port to provide the output FMB;
   at least one vacuum pump coupled to the first and second packed columns; and
   a control unit configured to:
   provide water to the first and second separator stages to maintain the separated FMB and the output FMB at the same alcohol by volume (ABV) as the input FMB; and
   control input of carbon dioxide and vacuum pressure to produce a flow rate that maintains the output FMB at the same ABV as the input FMB.

2. The apparatus of claim 1, wherein the control unit is configured to add water to the first and second separator stages to cause the output FMB and combined first and second portions of the NACB to have the same volume as the input FMB.

3. The apparatus of claim 1, including:
   at least one heat source coupled to the first and second packed columns;
   a first condenser coupled to the first output port of the first packed column, and the first portion of the NACB is produced by evaporation in the first packed column using the at least one heat source and condensation by the first condenser; and
   a second condenser coupled to the second output of the second packed column, and the output FMB is produced by evaporation in the second packed column using the at least one heat source and condensation by the second condenser.

4. The apparatus of claim 1, wherein the second separator stage produces the output FMB that is a clear beverage.

5. The apparatus of claim 1, wherein the first portion of the NACB from the first separator stage includes components separated from the input FMB that have a boiling point lower than ethanol.

6. The apparatus of claim 5, wherein the first and second portions of the NACB are combined to produce a combined output NACB that is less than 0.5% ABV.

7. The apparatus of claim 1, including:
   a filter arranged prior to the first separator stage to filter the input FMB prior to the first separator stage; and
   a heat source coupled to the filter to heat the filtered input FMB prior to the first separator stage.

* * * * *